(12) United States Patent
Fox, Jr.

(10) Patent No.: US 8,864,080 B2
(45) Date of Patent: Oct. 21, 2014

(54) EXPENDABLE AERIAL DELIVERY SYSTEM

(71) Applicant: Roy L Fox, Jr., Belleville, WV (US)

(72) Inventor: Roy L Fox, Jr., Belleville, WV (US)

( * ) Notice: Subject to any disclaimer, the term of this patent is extended or adjusted under 35 U.S.C. 154(b) by 26 days.

(21) Appl. No.: 13/747,659

(22) Filed: Jan. 23, 2013

(65) Prior Publication Data

US 2013/0193272 A1 Aug. 1, 2013

Related U.S. Application Data

(60) Provisional application No. 61/592,753, filed on Jan. 31, 2012.

(51) Int. Cl.
*B64D 1/12* (2006.01)

(52) U.S. Cl.
CPC ...................................... *B64D 1/12* (2013.01)
USPC ................... 244/137.3; 244/137.4; 106/51.11

(58) Field of Classification Search
USPC ..................................................... 244/137.3
See application file for complete search history.

(56) References Cited

U.S. PATENT DOCUMENTS

| | | | |
|---|---|---|---|
| 2,483,088 A | 9/1949 | DeHaven | |
| 2,502,097 A | 3/1950 | Linder | |
| 2,665,153 A | 1/1954 | Gross | |
| 2,712,913 A | 7/1955 | Stanley | |
| 2,774,560 A | 12/1956 | Johnson | |
| 2,858,774 A * | 11/1958 | Batten | 410/67 |
| 2,924,408 A | 2/1960 | Yost | |
| 3,110,459 A | 11/1963 | Heinrich | |
| 3,122,392 A | 2/1964 | Benditt et al. | |
| 3,266,757 A | 8/1966 | Guienne | |
| 3,466,081 A | 9/1969 | Femia | |
| 3,692,262 A | 9/1972 | Gaylord | |
| 3,724,788 A * | 4/1973 | Petry et al. | 244/137.3 |
| 4,030,689 A | 6/1977 | Rodriguez | |
| 4,050,381 A | 9/1977 | Heinemann | |
| 4,095,769 A * | 6/1978 | Fengels | 248/346.02 |
| 4,155,286 A | 5/1979 | Mihm | |
| 4,161,301 A | 7/1979 | Beardsley et al. | |
| 4,256,012 A | 3/1981 | Cowart | |
| 4,337,913 A | 7/1982 | Booth | |
| 4,339,098 A | 7/1982 | Tardot et al. | |
| 4,342,437 A | 8/1982 | Farinacci | |
| 4,379,534 A * | 4/1983 | Miller et al. | 244/137.4 |
| 4,392,411 A | 7/1983 | Minkler | |
| 4,493,240 A | 1/1985 | Norton | |
| 4,592,524 A | 6/1986 | Nohren et al. | |
| 4,697,765 A | 10/1987 | Wimmer | |
| 4,750,404 A | 6/1988 | Dale | |
| 4,765,571 A | 8/1988 | Barbe | |
| 4,892,272 A * | 1/1990 | Hadzicki | 244/153 R |
| 4,955,564 A | 9/1990 | Reuter | |
| 4,998,480 A | 3/1991 | Denis et al. | |
| 5,003,882 A | 4/1991 | Frehaut et al. | |
| 5,205,517 A | 4/1993 | Reuter | |
| 5,361,676 A | 11/1994 | Gibbs | |
| 5,618,011 A | 4/1997 | Sadeck et al. | |
| 5,668,346 A | 9/1997 | Kunz et al. | |

(Continued)

*Primary Examiner* — Christopher P Ellis
*Assistant Examiner* — Medhat Badawi
(74) *Attorney, Agent, or Firm* — Snell & Wilmer L.L.P.

(57) ABSTRACT

Methods and systems for aerial delivery utilize expendable materials. An expendable aerial delivery system comprises wood, textile and/or other expendable materials, for example materials suitable for disposing via burning or crushing in a forward area. In this manner, valuable and/or expensive metal platforms can be eliminated from airdrops, thus preventing insurgent repurposing of these platforms into improvised explosive devices and other implements of warfare.

12 Claims, 21 Drawing Sheets

(56) References Cited

U.S. PATENT DOCUMENTS

| | | | |
|---|---|---|---|
| 5,697,581 A * | 12/1997 | Conroy et al. | 244/137.3 |
| 5,703,315 A | 12/1997 | Coggan | |
| 2,834,083 A | 5/1998 | Newell et al. | |
| 5,816,535 A * | 10/1998 | Underwood et al. | 244/137.3 |
| 5,884,867 A | 3/1999 | Gordon et al. | |
| 5,887,825 A | 3/1999 | Noel | |
| 5,890,678 A | 4/1999 | Butler, Jr. | |
| 5,899,415 A | 5/1999 | Conway et al. | |
| 6,070,832 A | 6/2000 | Redd | |
| 6,249,937 B1 | 6/2001 | Grenga | |
| 6,260,797 B1 | 7/2001 | Palmer | |
| 6,308,642 B1 | 10/2001 | Branham | |
| 6,339,929 B1 | 1/2002 | Udagawa et al. | |
| 6,431,088 B2 * | 8/2002 | Mahnken | 108/57.12 |
| 6,644,597 B1 | 11/2003 | Bahniuk | |
| 6,669,146 B2 | 12/2003 | Lee et al. | |
| 6,789,766 B2 | 9/2004 | Horst | |
| 7,252,270 B2 | 8/2007 | Mitzmacher | |
| 7,264,205 B2 | 9/2007 | Fox, Jr. | |
| 7,967,254 B2 | 6/2011 | Fox | |
| 8,033,507 B2 | 10/2011 | Fox | |
| 8,083,184 B2 | 12/2011 | Fox | |
| 8,538,605 B1 * | 9/2013 | Riley | 701/3 |
| 2001/0050035 A1 * | 12/2001 | Mahnken | 108/57.12 |
| 2004/0099187 A1 * | 5/2004 | Cox, Jr. | 108/51.11 |
| 2004/0108416 A1 | 6/2004 | Parkinson | |
| 2004/0112260 A1 * | 6/2004 | Grainger | 108/53.1 |
| 2005/0230555 A1 | 10/2005 | Strong | |
| 2007/0018051 A1 * | 1/2007 | Zapirain | 244/152 |
| 2008/0017754 A1 | 1/2008 | Taylor | |
| 2008/0149775 A1 | 6/2008 | Dunker et al. | |
| 2008/0283669 A1 | 11/2008 | Hansson et al. | |
| 2009/0120332 A1 * | 5/2009 | Heinrichs et al. | 108/53.5 |
| 2009/0127397 A1 * | 5/2009 | Hyunh et al. | 244/152 |
| 2009/0302164 A1 * | 12/2009 | Fox, Jr. | 244/137.3 |
| 2011/0167613 A1 * | 7/2011 | Sadeck | 29/525.01 |
| 2011/0303128 A1 * | 12/2011 | Linares | 108/51.3 |
| 2011/0318097 A1 * | 12/2011 | Parkinson | 403/322.4 |
| 2012/0009040 A1 * | 1/2012 | Parkinson | 410/96 |
| 2012/0025027 A1 * | 2/2012 | Yandle et al. | 244/137.1 |
| 2012/0145833 A1 * | 6/2012 | McCann et al. | 244/151 A |
| 2012/0305713 A1 * | 12/2012 | Deazley et al. | 244/152 |
| 2013/0048787 A1 * | 2/2013 | Riley et al. | 244/137.1 |

* cited by examiner

"TYPE V" AERIAL DELIVERY
PLATFORM 101

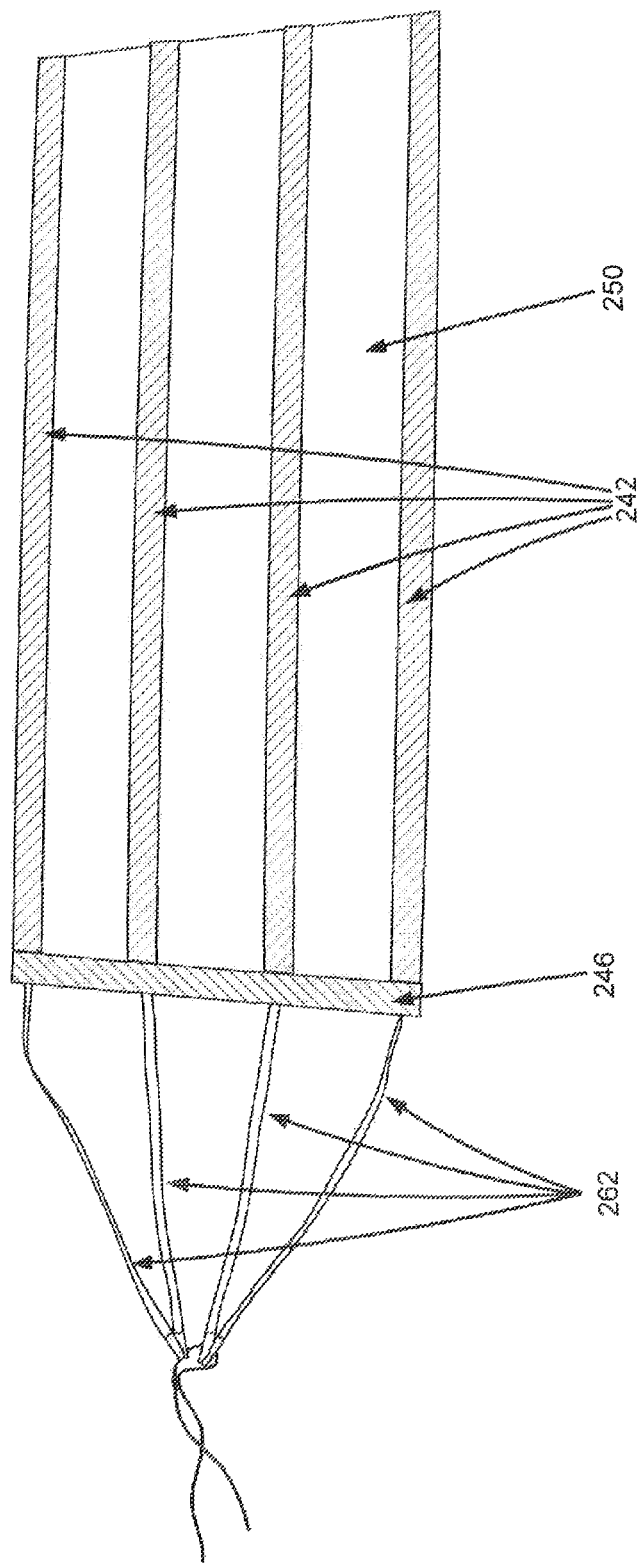

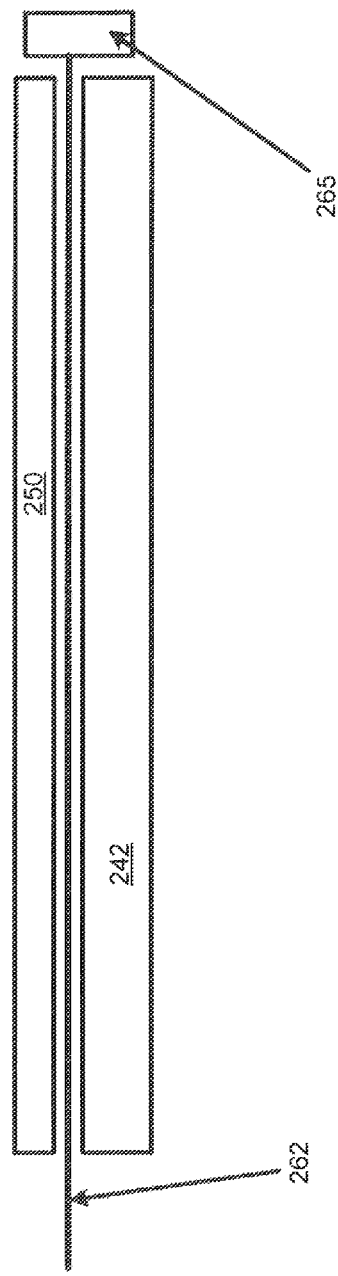
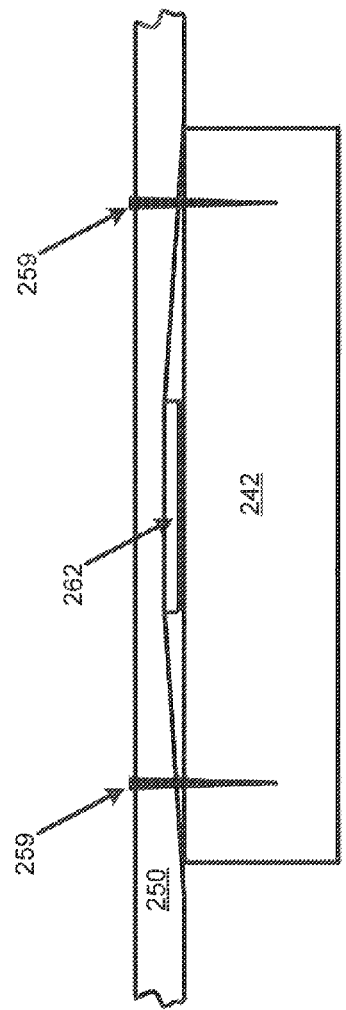
FIG. 3A
FIG. 3B

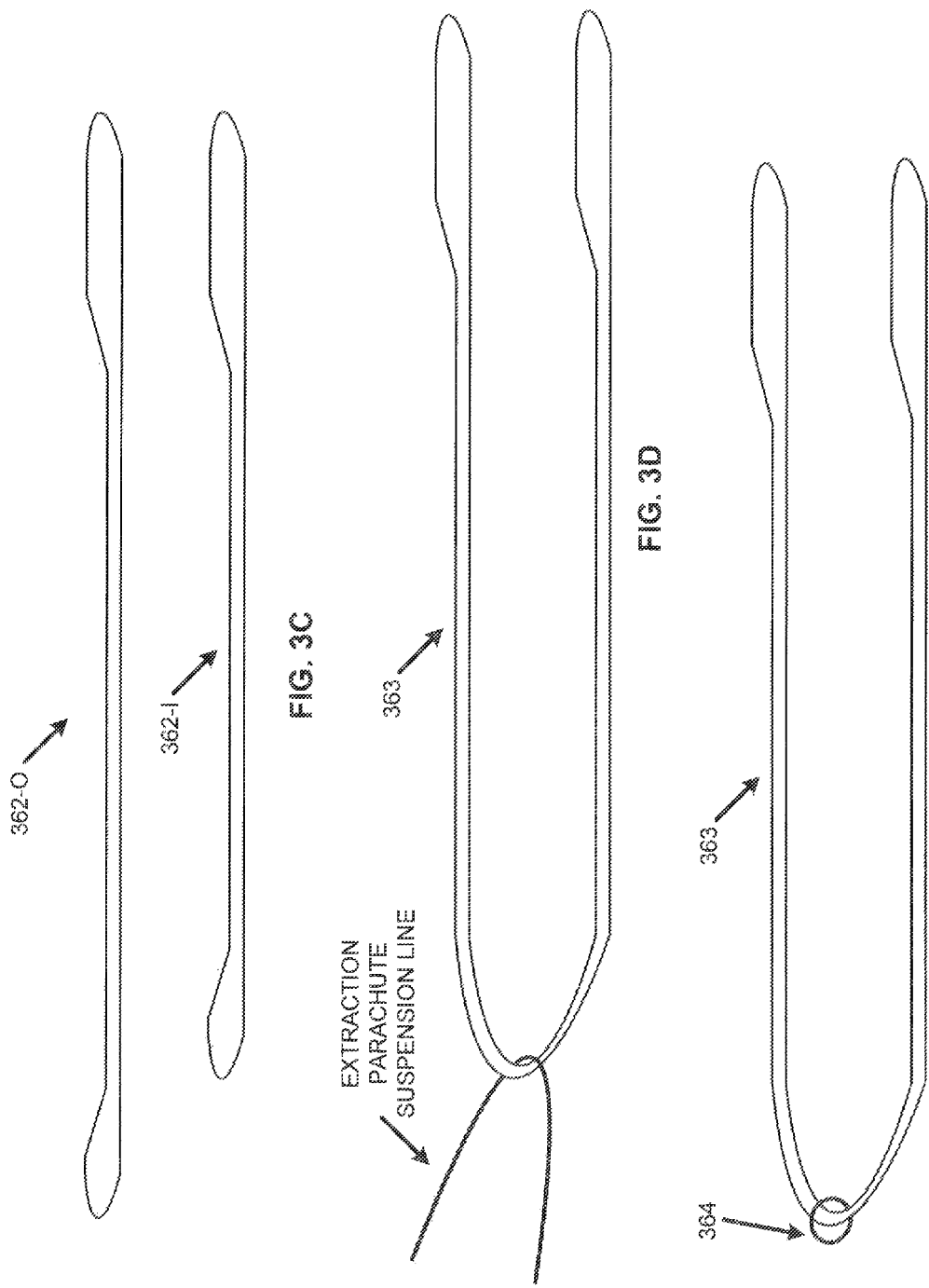

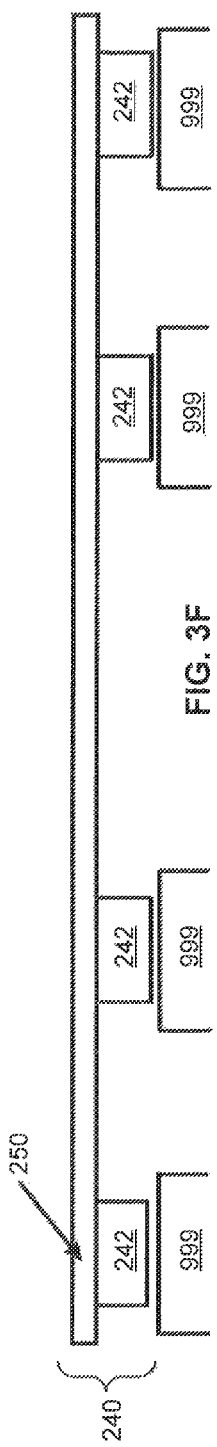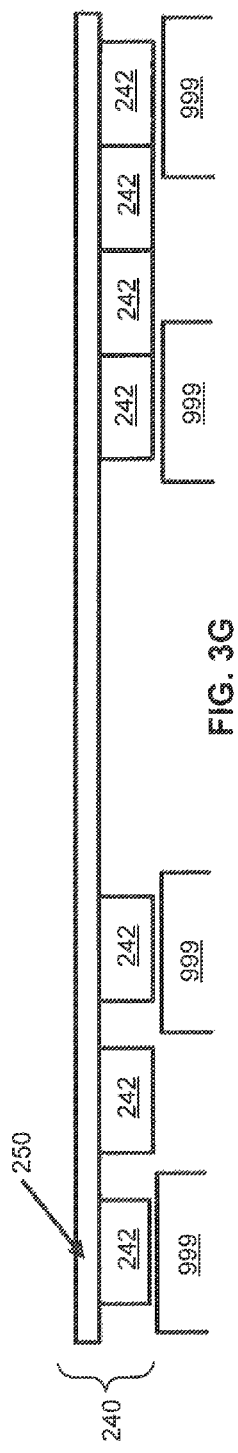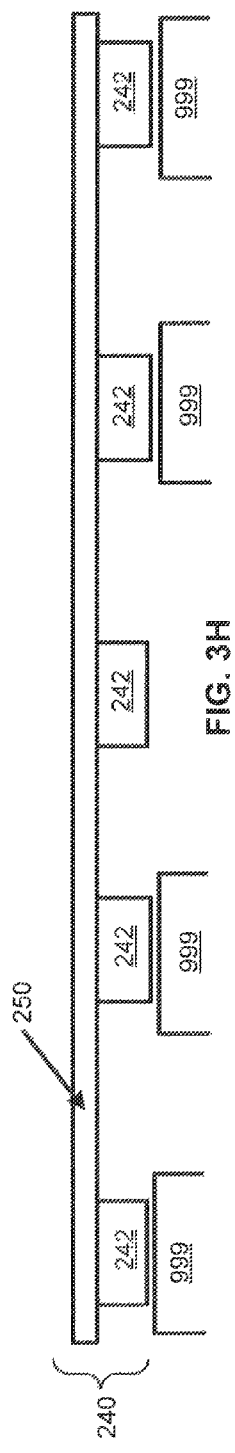

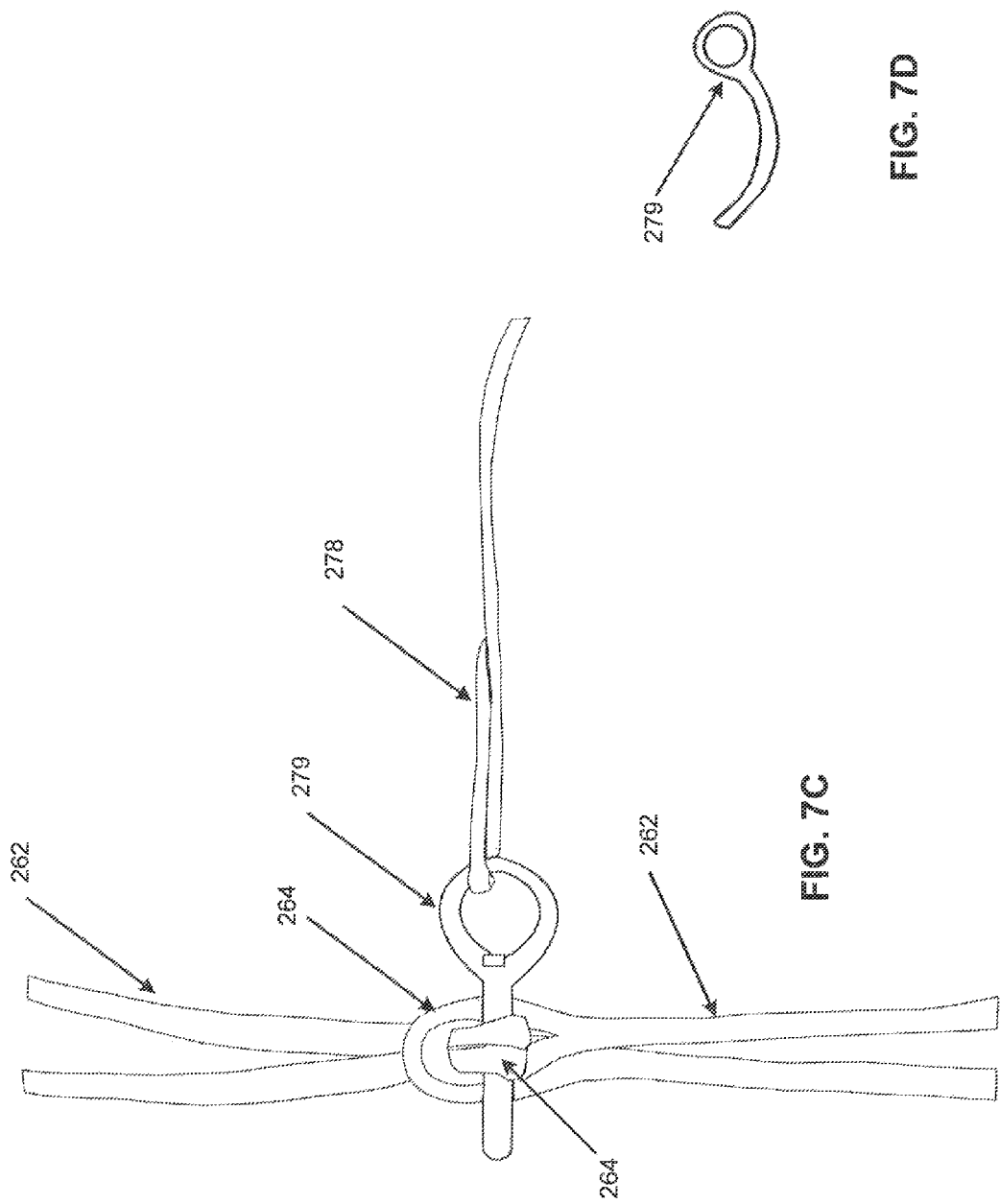

EXPENDABLE AERIAL DELIVERY SYSTEM

CROSS REFERENCE TO RELATED APPLICATIONS

This application claims priority to and is a non-provisional of U.S. Provisional No. 61/592,753 filed on Jan. 31, 2012 and entitled "EXPENDABLE AERIAL DELIVERY SYSTEM." This provisional application is hereby incorporated by reference in its entirety.

TECHNICAL FIELD

The present disclosure relates to aerial delivery, and particularly to forward aerial delivery utilizing expendable materials.

BACKGROUND

In a war zone, a large percentage of supplies are airdropped, for example in order to decrease the number of ground vehicles that are exposed to roadside bombs, ambushes, and the like. Typically, an airdropped package is a small bundle of about 500 pounds to about 2000 pounds, which utilizes as a base a 4'×4' sheet of plywood. Type V aluminum platforms, which can deliver much larger and/or heavier payloads, are generally not used in forward air drops. This is because it is undesirable to leave large amounts of metal where it could be retrieved by the enemy and repurposed, for example converted into components for improvised explosive devices. Additionally, retrieving such hardware and returning it to the "rear" is often cumbersome, time-consuming, and otherwise unrealistic. Accordingly, improved aerial delivery systems and methods are desirable.

SUMMARY

The present disclosure relates to systems and methods for aerial delivery utilizing expendable components. In an exemplary embodiment, an expendable aerial delivery system comprises a platform comprising an expendable material, and a roller plank coupled to the platform. The roller plank comprises an expendable material. The expendable aerial delivery system further comprises a sling configured to couple the platform to a parachute, and a strap configured to retain a payload to the platform.

In another exemplary embodiment, a method for aerial delivery comprises deploying an extraction parachute coupled to an expendable aerial delivery system; extracting, responsive to inflation of the extraction parachute, the expendable aerial delivery system from a cargo aircraft; releasing a releasable interface coupling the extraction parachute to the expendable aerial delivery system; and deploying, responsive to releasing the releasable interface, a main parachute coupled to the expendable aerial delivery system.

The contents of this summary section are provided only as a simplified introduction to the disclosure, and are not intended to be used to limit the scope of the appended claims.

BRIEF DESCRIPTION OF THE DRAWINGS

With reference to the following description, appended claims, and accompanying drawings:

FIG. 2E illustrates a bottom view of an expendable aerial delivery system in accordance with an exemplary embodiment;

FIG. 2I illustrates multiple payloads coupled to an expendable aerial delivery system in accordance with an exemplary embodiment;

FIG. 3A illustrates a side view of an expendable aerial delivery system configured with a stop block in accordance with an exemplary embodiment;

FIG. 3B illustrates an end view of an expendable aerial delivery system wherein a sling is disposed directly between a platform and a roller plank in accordance with an exemplary embodiment;

FIG. 3C illustrates slings of various lengths for use in an expendable aerial delivery system in accordance with an exemplary embodiment;

FIGS. 3D and 3E illustrate a combined sling for use in an expendable aerial delivery system in accordance with an exemplary embodiment;

FIGS. 3F through 3H illustrate placement of additional roller planks for increasing structural rigidity of an expendable aerial delivery system in accordance with various exemplary embodiments;

FIG. 7C illustrates use of a pull pin for sling release at the "front" of an expendable aerial delivery system in accordance with an exemplary embodiment; and FIG. 7D illustrates a curved pull pin suitable for use in an expendable aerial delivery system in accordance with an exemplary embodiment.

DETAILED DESCRIPTION

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from the scope of the appended claims.

For the sake of brevity, conventional techniques for aerial delivery, payload rigging, parachute operation, and/or the like may not be described in detail herein. Furthermore, the connecting lines shown in various figures contained herein are intended to represent exemplary functional relationships and/or physical couplings between various elements. It should be noted that many alternative or additional functional relationships and/or physical connections may be present in a practical expendable aerial delivery system.

Figure 1A:
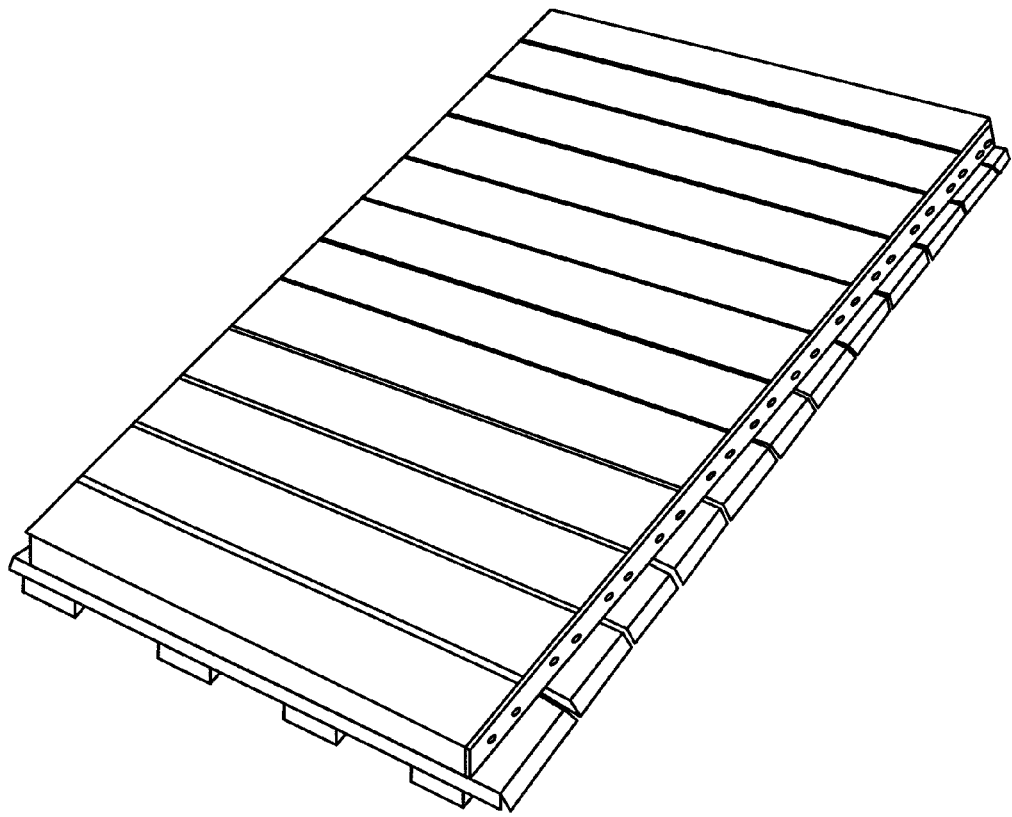
FIGS. 1A and 1B illustrate a conventional Type V aerial delivery platform.
Figure 1B:
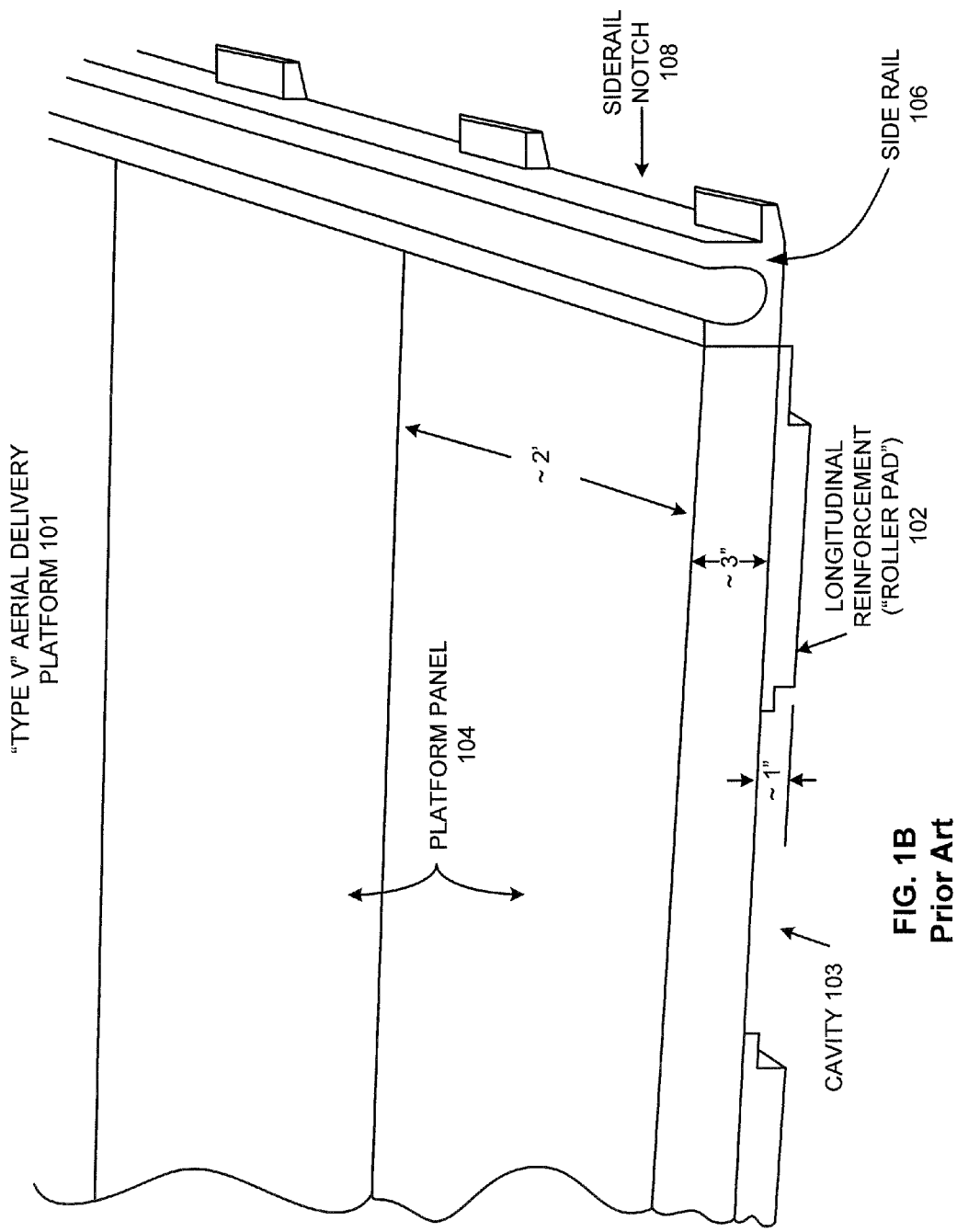

An aerial delivery platform, for example a typical Type V aerial delivery platform 101 illustrated in FIGS. 1A and 1B, often comprises aluminum and/or other metal components in order to support a desired payload weight. With reference to FIG. 1B, an exemplary Type V aerial delivery platform 101 comprises a plurality of platform panels 104 adjacent to one another. Platform panels 104 may be any suitable dimension, but are commonly about 2 feet in width and about 3 inches in height. Coupled to platform panels 104 are a plurality of longitudinal reinforcements, for example roller pads 102. Roller pads 102 may be configured with any suitable dimensions, but are commonly about 1 inch in height. Roller pads 102 are spaced at intervals such that one or more cavities 103 are created therebetween. Generally, roller pads 102 are configured to align with rollers in cargo aircraft. Along two sides of aerial delivery platform 101 are disposed two side rails 106 including side rail notches 108. Side rails 106 and side rail notches 108 are configured to allow aerial delivery platform 101 to interface with mounting and deployment systems in cargo aircraft.

Once a payload is airdropped on a conventional metal Type V platform and retrieved, the Type V platform is thereafter sometimes left behind, whether out of necessity or otherwise. Accordingly, Type V platforms have been recovered and re-purposed by enemy troops and/or insurgents, for example via incorporation into improvised explosive devices and other implements of warfare. To reduce this occurrence, forward air drops typically utilize small payloads of about 500 pounds to about 2000 pounds, coupled to a square un-reinforced wooden platform about 4 feet on a side. As the amount of material to be airdropped increases, additional platforms, parachutes, and the like are required; additionally, the air-dropped material is typically dispersed over a wider area as the deploying aircraft moves over the target area as the airdrop progresses.

In contrast, inexpensive and/or expendable aerial delivery systems may desirably be utilized to deliver larger and/or heavier payloads than are suitable for a small 4'×4' wood platform. In this manner, more material may be delivered per airdrop, the total material may be delivered via fewer airdrops, and/or large items previously deliverable only via a metal Type V platform may be delivered without utilizing a metal Type V platform. Additionally, the risk of leaving valuable metal for the enemy to recover, and/or other limitations of prior aerial delivery systems may suitably be addressed by use of an expendable aerial delivery system and related methods in accordance with principles of the present disclosure.

As used herein, by way of example, objects comprised of wood (including but not limited to lumber, pressure treated wood, plywood, particle board, oriented strand hoard, and other suitable wood and/or wood-derived products), cloth, rope, paper, cardboard, organic fibers, synthetic fibers, plastics, and/or the like shall be considered to be "expendable". Moreover, objects which may be substantially destroyed, rendered non-reusable, and/or otherwise disposed of via a conventional open-air tire may be considered to be "expendable". Yet further, objects which may be substantially destroyed, rendered non-reusable, and/or otherwise disposed of via mechanical crushing, shredding, and/or chipping (for example, via a wood chipper, or via a piece of heavy earth-moving equipment) may be considered to be "expendable". In contrast to all the above, by way of example, objects comprised solely or primarily of metal shall not be considered to be "expendable".

Figure 2A:
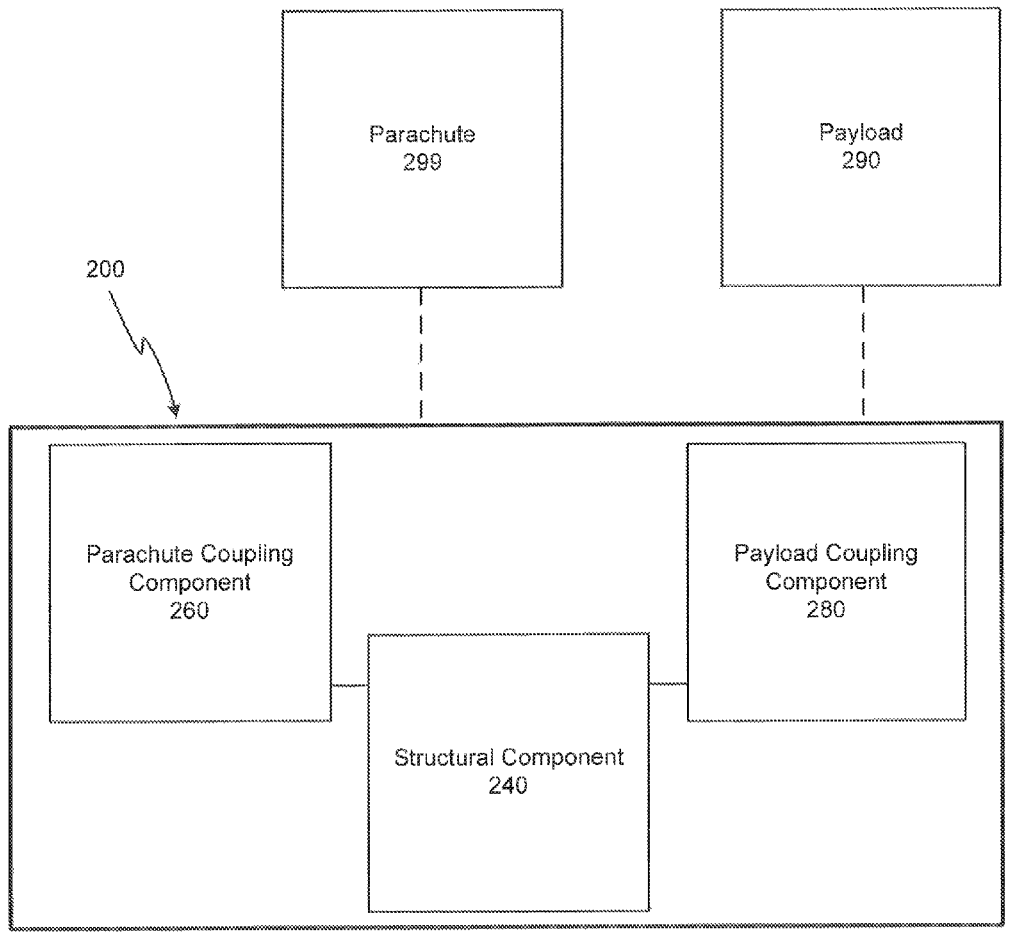
FIG. 2A illustrates a block diagram of an expendable aerial delivery system in accordance with various exemplary embodiments.

An expendable aerial delivery system may be any system configured to be at least partially abandoned, destroyed, and/or otherwise disposed of after an airdrop is completed. For example, an expendable aerial delivery system may be configured to be disposed of via burning after the payload is recovered. With reference now to FIG. 2A, in accordance with various exemplary embodiments an expendable aerial delivery system 200 generally comprises a structural component 240, a parachute coupling component 260, and a payload coupling component 280. Structural component 240 can comprise one or more platforms, planks, rails, and/or other structural components configured to at least partially support a payload during aerial delivery. Moreover, although the term "plank" is used herein in reference to components of certain exemplary embodiments, it will be appreciated that principles of the present disclosure are applicable to systems and devices having various longitudinal and/or lateral stiffeners, struts, beams, compression members, and/or the like, and thus references to a "plank" or "planks" are by way of illustration and not of limitation.

In various exemplary embodiments, parachute coupling component 260 is coupled to structural component 240. Parachute coupling component 260 may comprise webbing, straps, cordage, and/or the like and/or other suitable components and/or combinations thereof configured to couple structural component 240 to a parachute or other suitable device configured extract structural component 240 from an aircraft and/or to slow the descent of a payload through the air.

Payload coupling component 280 may be coupled to structural component 240 and/or parachute coupling component 260. Payload coupling component 280 may comprise webbing, straps, cordage, and/or the like, and/or other suitable components and/or combinations thereof configured to couple a payload to structural component 240.

Expendable aerial delivery system 200 may be configured to be interchangeable with a conventional metal Type V platform. Stated another way, expendable aerial delivery system 200 may be configured to be compatible with conventional mounting and deployment systems in cargo aircraft. In an exemplary embodiment, expendable aerial delivery system 200 is configured to be secured inside a cargo aircraft via ratchet straps. In another exemplary embodiment, expendable aerial delivery system 200 is configured to be secured inside a cargo aircraft via notches in the side of expendable aerial delivery system 200, similar to how a metal Type V platform is secured. Moreover, expendable aerial delivery system 200 may be secured inside a cargo aircraft in any suitable manner.

Expendable aerial delivery system 200 may be configured to be compatible with typical aerial delivery payload weight ranges. In various exemplary embodiments, expendable aerial delivery system 200 is configured to be compatible with payloads having a weight of between about 500 pounds and about 42,000 pounds.

Figure 2B:
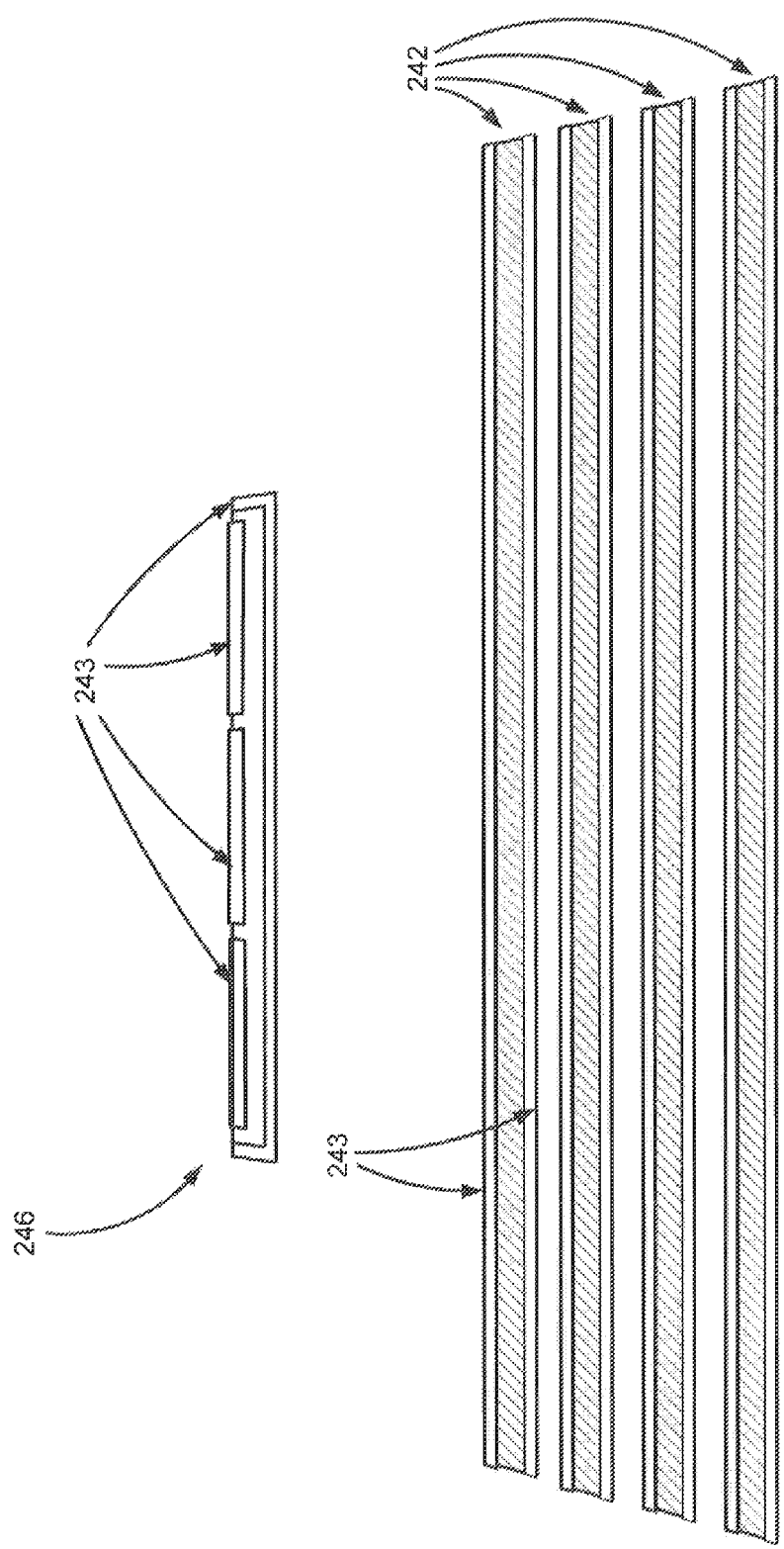
FIG. 2B illustrates plank components of an expendable aerial delivery system in accordance with an exemplary embodiment.
Figure 2C:
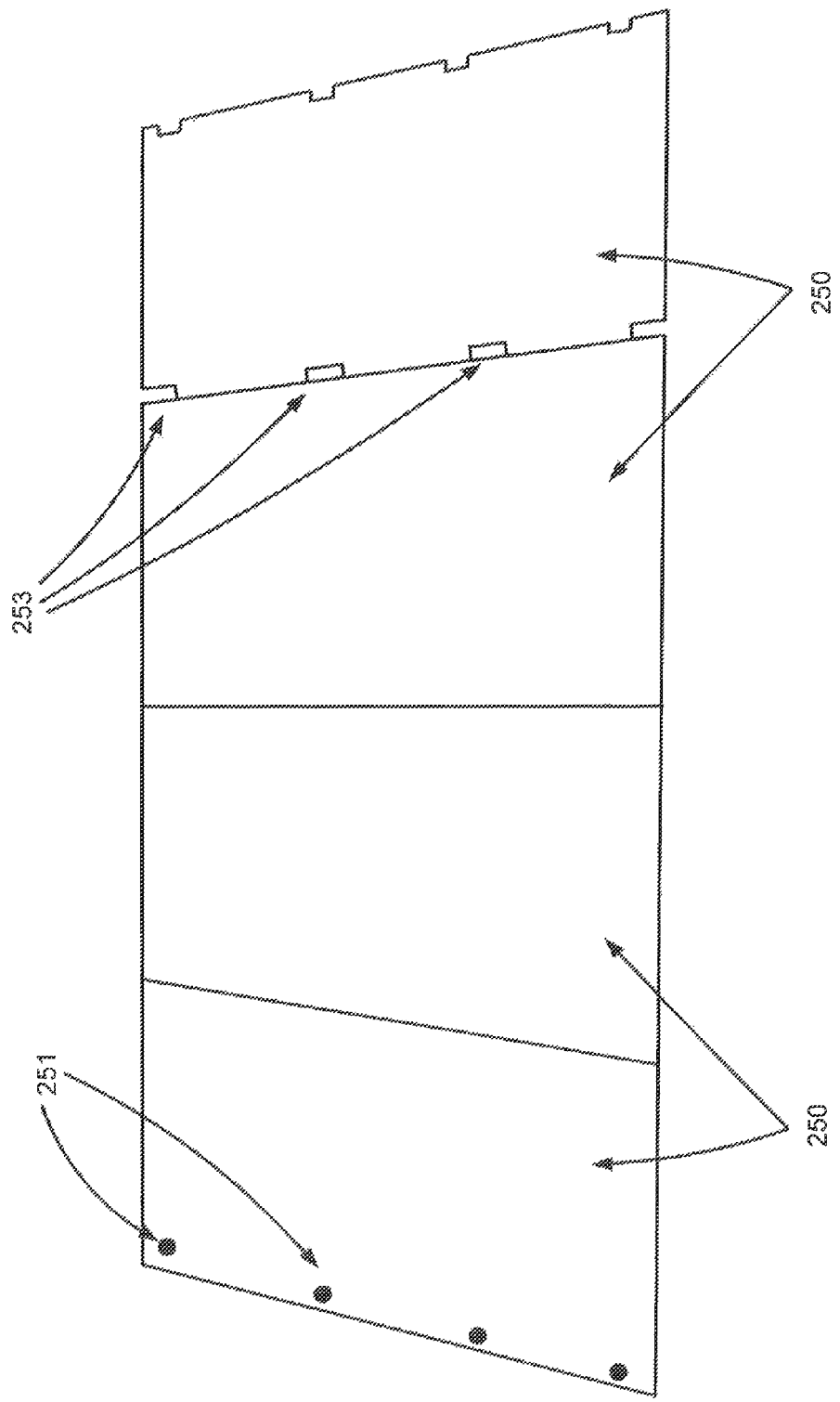
FIG. 2C illustrates platform components of an expendable aerial delivery system in accordance with an exemplary embodiment.
Figure 6:
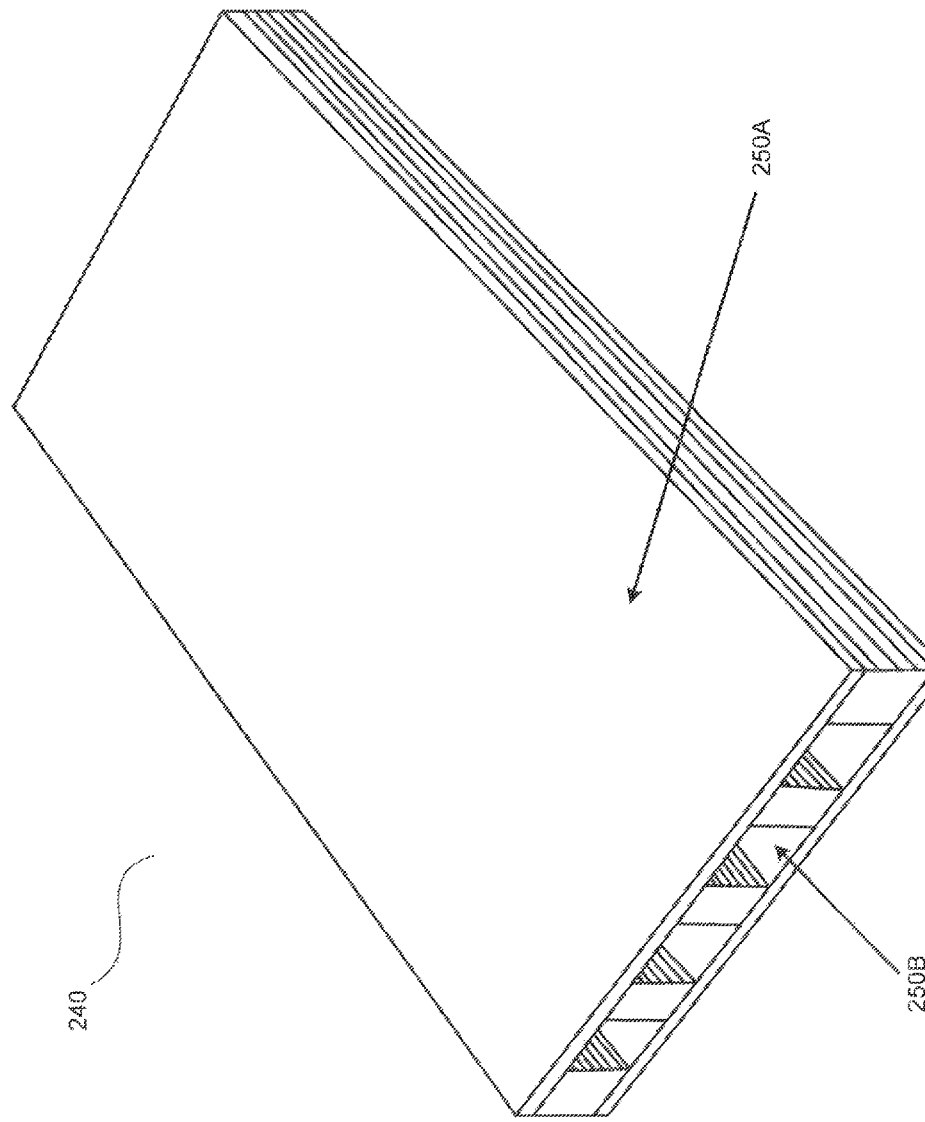
FIG. 6 illustrates a multi-layered platform for an expendable aerial delivery system in accordance with an exemplary embodiment.

With reference now to FIGS. 2A through 2C, in various exemplary embodiments structural component 240 may comprise any suitable expendable materials and/or structures configured to support a payload during aerial delivery. In an exemplary embodiment, structural component 240 comprises a plurality of roller planks 242, and at least one wooden platform 250. In certain exemplary embodiments, structural component 240 further comprises at least one end plank 246. With momentary reference to FIG. 6, it will be appreciated that in various exemplary embodiments, structural component 240 may comprise multiple layers of wooden platform(s) 250, for example an upper wooden platform 250A and a lower wooden platform 250B. Utilizing a lower wooden platform 250B may be desirable, for example, in order to ensure structural component 240 remains atop roller pads in a cargo aircraft despite lateral forces and/or movement, for example forces resulting from turbulence.

In various exemplary embodiments, and with reference to FIG. 2B, roller plank 242 is configured to add rigidity and/or other structural strength to structural component 240. In certain exemplary embodiments, roller plank 242 is configured to act as a longitudinal reinforcing portion of structural component 240. In some exemplary embodiments, roller plank 242 is configured with spacers 243 running lengthwise on either side thereof. Spacers 243 may be coupled to roller plank 242 in any suitable manner. For example, spacers 243 may be coupled to roller plank 242 via glue, staples, nails, screws, and/or the like, in certain exemplary embodiments, spacers 243 may be integrally formed with roller plank 242.

By placing spacers 243 on either side of a roller plank 242, a channel is formed atop roller plank 242; stated another way, spacers 243 provide a cavity between roller plank 242 and platform 250 when roller plank 242 is coupled to platform 250. Generally, the dimensions of the channel may be selected based at least in part on the dimensions of a sling 262. In various exemplary embodiments, spacers 243 are configured with a height of between about 0.1 inches and about 2 inches. In an exemplary embodiment, spacers 243 are configured with a height of about 0.75 inches. In various exemplary embodiments, roller plank 242 and spacers 243 are sized such that the channel formed therefrom has dimensions of about 2 inches wide and about 0.75 inches in height. Moreover, any suitable dimensions may be used, for example based at least in part on the weight of a payload contemplated for use with expendable aerial delivery system 200.

In an exemplary embodiment, roller plank 242 and spacers 243 are formed of wood. Roller plank 242 and spacers 243 may be formed from comparatively strong, hard, and/or dense woods, for example lumber from angiosperm trees such as oak, cherry, hickory, and/or the like. Moreover, roller plank 242 and spacers 243 may be formed from comparatively less strong, hard, and/or dense woods, for example lumber from coniferous trees such as pine, spruce, hemlock, and/or the like. In other exemplary embodiments, roller plank 242 and spacers 243 are formed of one or more of plywood, oriented strand board, high density polyethelyne (HDPE), polyvinyl chloride (PVC), acrylonitrile butadiene styrene (ABS), fiber-reinforced composite materials, and/or the like. Moreover, roller plank 242 and/or spacers 243 may comprise any suitable expendable material.

In certain exemplary embodiments, roller plank 242 may optionally be coated with and/or coupled to a rigid cladding. In this manner, roller plank 242 may be made more resistant to indentation and/or deformation, for example indentation arising from contact with rollers in a cargo aircraft. For example, a thin metal cladding may be utilized. Moreover, in various exemplary embodiments the bulk of roller plank 242 may be formed from a first material having a first compressive strength, while a smaller portion and/or layer of roller plank 242 (for example, an outer layer) may be formed from a second material having a second, higher compressive strength.

In various exemplary embodiments, roller planks 242 are configured to extend approximately the length of structural component 240. In other exemplary embodiments, roller planks 242 are configured to extend slightly less than the length of structural component 240 in order to provide space for one or more end planks 246 at an end thereof. In certain exemplary embodiments, roller planks 242 are disposed evenly along structural component 240. Stated another way, in certain exemplary embodiments, a first roller plank 242 is disposed at one edge of structural component 240, a second roller plank 242 is disposed at an opposing edge of structural component 240, and the remaining roller planks 242 are evenly distributed therebetween. Moreover, in various exemplary embodiments, roller planks 242 are configured to align with rows of floor rollers in military cargo planes. In this manner, roller planks 242 can facilitate loading of expendable aerial delivery system 200 in (and/or deployment of expendable aerial delivery system 200 from) a military cargo aircraft.

In various exemplary embodiments, with momentary reference to FIGS. 3F through 3H, structural component 240 may be configured with roller planks 242 in locations that may not necessarily align with floor rollers 999 in military cargo planes. For example, structural component 240 may be configured with additional roller planks 242 in order to increase the structural rigidity of structural component 240.

With reference now to FIG. 3F, in an exemplary embodiment structural component 240 comprises four roller planks 242 configured to generally align with floor rollers in a cargo plane. Turning now to FIGS. 3G and 3H, in various other exemplary embodiments structural component 240 comprises one or more additional roller planks 242. The additional roller planks 242 may at least partially align with floor rollers 999; moreover, the additional roller planks 242 may not align with any floor roller 999. Any suitable number of roller planks 242 may be used, and any suitable spacing between roller planks 242 may be used. Adjacent roller planks 242 may touch one another, if desired. The number of roller planks 242 may be selected based at least in part on the weight of a payload intended for use with structural component 240, the material forming platform 250, the dimensions of platform 250, the material forming roller plank 242, the dimensions of roller plank 242, and/or the like.

In various exemplary embodiments, structural component 240 is configured with at least one end plank 246. End plank 246 may comprise wood, or other suitable expendable structural materials, similar to roller planks 242, in certain exemplary embodiments, end plank 246 is disposed on the end of structural component 240 that will be closest to an extraction parachute. In this manner, end plank 246 provides increased structural rigidity for structural component 240. Moreover, in this position end plank 246 can act as a spreader bar, reducing the likelihood of extraction parachute forces (for example, forces transferred by slings 262) from crushing platform 250 toward the centerline of expendable aerial delivery system 200. For convenience, the end of expendable aerial delivery system 200 that will be closest to an extraction parachute (i.e., the end of expendable aerial delivery system 200 that will first exit a cargo airplane) may be referred to herein as the "rear"; the end of expendable aerial delivery system 200 that will be furthest from an extraction parachute may be referred to herein as the "front".

In certain exemplary embodiments, structural component 240 is configured absent an end plank 246. For example, end plank 246 may be omitted when other portions of structural component 240 provide sufficient crush resistance toward the centerline of structural component 240 responsive to operation of an extraction parachute. It will be appreciated that in addition to eliminating an end plank 246, structural component 240 may also be configured with multiple end planks 246, for example in order to provide increased rigidity, crush resistance, and/or the like.

In various exemplary embodiments, and with reference now to FIG. 2C, structural component 240 comprises at least one platform 250. In an exemplary embodiment, platform 250 comprises wood, for example lumber, plywood, oriented strand board, products engineered from cellulose fibers, fiberglass, and/or the like. Moreover, platform 250 may comprise any suitable expendable material or combination of expendable materials. Platform 250 may be configured as a single-ply structure; alternatively, platform 250 may be configured with multiple plies and/or layers.

Structural component 240 may comprise a single platform 250; moreover, structural component 240 may comprise multiple platforms 250 in order to provide a desired surface area for a payload. In an exemplary embodiment, structural component 240 comprises four platforms 250 disposed in a front-to-back line. Moreover, structural component 240 may comprise two parallel lines of platforms 250 and/or other suitable configurations.

Each platform 250 may be any suitable size. In an exemplary embodiment, each platform 250 comprises a conventional 4'×8' sheet of plywood. In another exemplary embodiment, each platform 250 comprises a 4'×9' sheet of plywood. Moreover, platforms 250 may be sized as desired, for example in order to accommodate a particular payload and/or to retain compatibility of expendable aerial delivery system 200 with systems designed to deploy conventional metal Type V platforms.

Structural component 240 may comprise any suitable number of platforms 250. In various exemplary embodiments, structural component 240 comprises four platforms 250. In various exemplary embodiments, platforms 250 forming either end of structural component 240 are configured with one or more notches and/or holes (for example, holes 251 and/or notches 252 as illustrated in FIG. 2C) in order to interface with parachute coupling component 260.

In various exemplary embodiments, structural component 240 comprises multiple platforms 250 coupled to multiple roller planks 242, in an exemplary embodiment, structural component 240 comprises four platforms 250 coupled to four roller planks 242 and one end plank 246 (for example, as illustrated in FIG. 2E).

In various exemplary embodiments, structural component 240 is configured with a length of between 8 feet and 32 feet. In certain exemplary embodiments, structural component 240 is configured with a length selected from the group consisting of 8, 12, 16, 20, 24, and 32 feet. Moreover, structural component 240 may be configured with a length based at least in part on a particular payload.

Figure 2D:
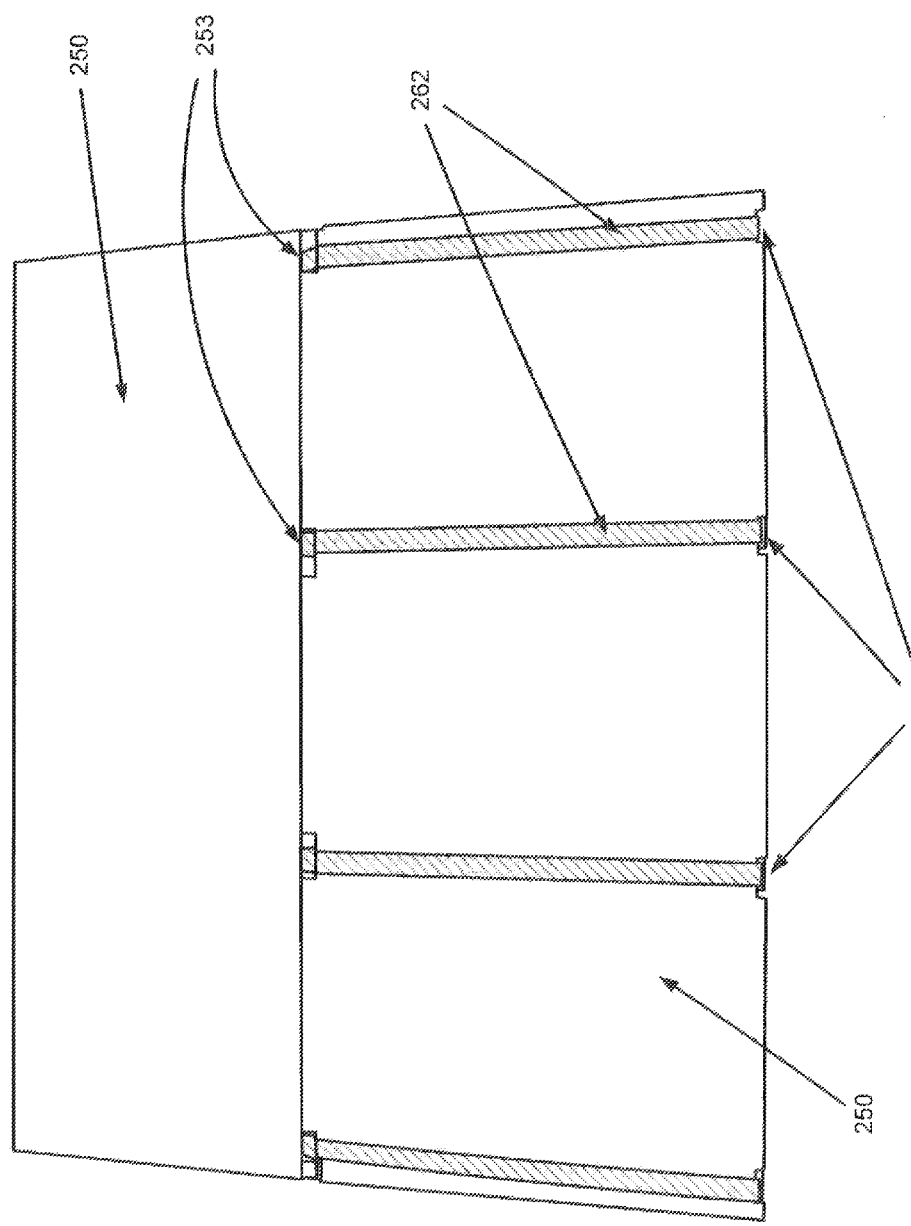
FIG. 2D illustrates sling components coupled to plank and platform components of an expendable aerial delivery system in accordance with an exemplary embodiment.
Figure 2F:
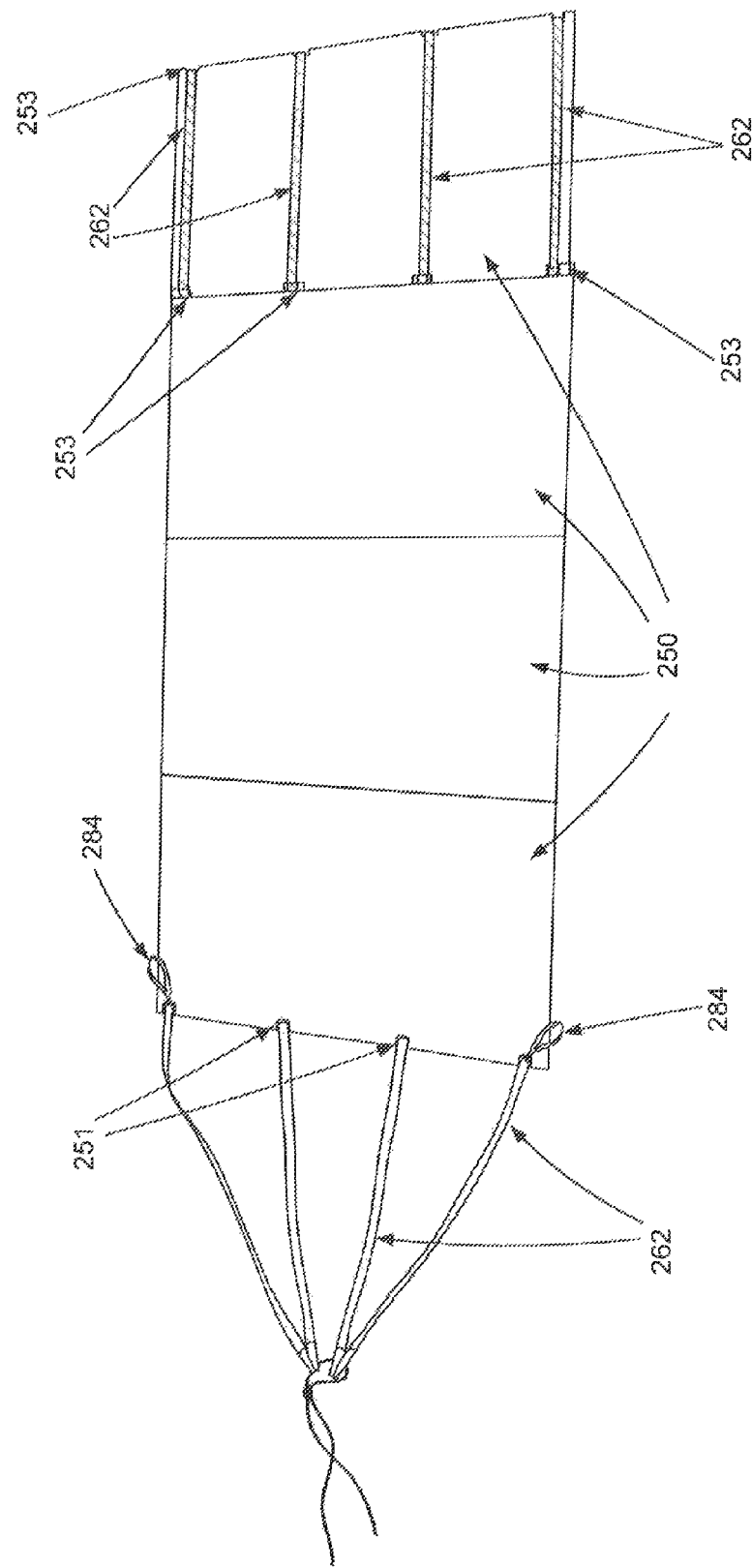
FIG. 2F illustrates a top view of an expendable aerial delivery system in accordance with an exemplary embodiment.

With reference now to FIGS. 2D-2F, in various exemplary embodiments parachute coupling component 260 is configured to couple structural component 240 to a parachute.

Parachute coupling component 260 may comprise slings, straps, webbing, cordage, and/or other suitable flexible and/or expendable material. Parachute coupling component 260 may comprise nylon, polyethylene terephthalate (e.g., Dacron® brand material), ultra-high molecular weight polyethelyne (e.g., Spectra® brand material), poly paraphenylene terephthalamide (e.g., Kevlar® brand material), and/or other high-modulus aramid fibers, and the like.

In various exemplary embodiments, parachute coupling component 260 comprises one or more slings 262. A sling 262 may be configured as a continuous loop; moreover, a sling 262 may be configured with an end loop 264 at one or more ends thereof. Sling 262 may be placed at least partially within a sheath or other protective material to reduce the likelihood of damage to sling 262, for example via frictional wear and/or the like. Sling 262 may comprise one ply and/or multiple plies, as desired.

In an exemplary embodiment, sling 262 comprises a loop of nylon having a tensile strength of about 15,000 pounds. In this exemplary embodiment, the material forming sling 262 is configured with a width of about 1.75 inches, a thickness of about 0.25 inches, and weighs about 4.9 ounces per yard. In various exemplary embodiments, sling 262 is formed from material configured with a tensile strength from between about 5,000 pounds to about 30,000 pounds.

In various exemplary embodiments, sling 262 is formed from one or more of poly paraphenylene terephthalamide (e.g., Kevlar® brand material), polypropylene, polyethylene, and/or the like.

In an exemplary embodiment, parachute coupling component 260 comprises four slings 262. In another exemplary embodiment, parachute coupling component 260 comprises eight slings 262. In yet another exemplary embodiment, parachute coupling component comprises two slings 262. Moreover, parachute coupling component 260 may comprise any suitable number of slings 262, for example depending on the size of expendable aerial delivery system 200, the weight of an associated payload 290, and/or the like. It will be appreciated that in various exemplary embodiments, a sling 262 is associated with a corresponding roller plank 242. For example, in one embodiment expendable aerial delivery system 200 is configured with six roller planks 242 and six slings 262. However, in various exemplary embodiments multiple slings 262 may be associated with a single roller plank 242 (i.e., multiple slings 262 may be at least partially routed and/or disposed within a channel formed between a roller plank 242 and a platform 250).

In an exemplary embodiment, sling 262 is configured with a length approximately equal to the length of structural component 240, plus an additional length for a "bridle segment". The selected bridle length may depend at least in part on the inward crushing resistance of structural component 240. It will be appreciated that as the bridle length increases, the crushing force exerted toward the centerline of structural component 240 is decreased. Moreover, a bridle segment length may be selected to achieve a desired angle between the bridle segment of outermost slings 262 and the longitudinal axis of structural component 240. In various exemplary embodiments, a bridle segment length is selected to achieve an angle of between about 20 degrees and about 10 degrees relative to the longitudinal axis of structural component 240. In an exemplary embodiment wherein structural component 240 is configured with a width of about 9 feet, the bridle segment length of an outermost sling 262 is configured with a length of between about 6.5 feet and about 10 feet. In an exemplary embodiment wherein structural component 240 is configured with a length of about 16 feet and a width of about 9 feet, the overall length of an outermost sling 262 is between about (16+6.5)=22.5 feet and about (16+10)=26 feet. Moreover, any suitable length or lengths for sling 262 may be utilized.

In an exemplary embodiment, four slings 262 are coupled to structural component 240 as follows:

The slings 262 are looped around a first platform 250 configured with notches 253. Each sling 262 encircles first platform 250 and is aligned with a set of notches 253 (for example, as illustrated in FIG. 2F). This first platform 250 will be disposed towards the "front" of expendable aerial delivery system 200. First platform 250 is fastened to four roller planks 242 such that the four slings 262 lie within the channels on the roller planks 242. Each sling 262 is disposed in the channel of a corresponding roller plank 242 along most and/or all of entire length of the roller plank 242, and two additional platforms 250 are fastened to the roller planks 242. Each sling 262 is passed through a corresponding hole 251 on a fourth platform 250, and the fourth platform 250 is fastened to the roller planks 242. It will be appreciated that instead of holes 251, notches 253 may instead be used. End plank 246 is secured to the fourth platform 250; in other words, end plank 246 is located at the "rear" of structural component 240. It will be appreciated that in this configuration, two slings 262 may be considered to be "outer" slings 262 (these slings 262 are closest to the respective sides of structural component 240). Moreover, in this configuration, two slings 262 may be considered to be "inner" slings 262 (i.e., these slings 262 have at least one sling 262 disposed between them and the respective sides of structural component 240).

With momentary reference to FIG. 3A, in various exemplary embodiments sling 262 is coupled to and/or encircles stop block 265. In these embodiments, rather than encircling first platform 250, sling 262 may simply be secured between first platform 250 and roller plank 242, and stop block 265 may be disposed at the "front" of expendable aerial delivery system 200.

In various exemplary embodiments, stop block 265 comprises one or more of wood, plastic, composite materials, and/or other suitable structural materials. Stop block 265 prevents sling 262 from being withdrawn from between platform 250 and roller plank 242 when force is exerted on sling 262 by an extraction parachute. Moreover, stop block 265 may be configured to distribute applied forces approximately equally onto both first platform 250 and roller plank 242. In this manner, shear forces between first platform 250 and roller plank 242 may be reduced. It will be appreciated that each sling 262 in expendable aerial delivery system 200 may be coupled to a corresponding stop block 265; moreover, multiple slings 262 may be coupled to a common stop block 265. In an exemplary embodiment, stop block 265 comprises a bar extending along approximately the entire width of structural component 240, and each sling 262 is coupled thereto.

Turning now to FIG. 3B, in various exemplary embodiments roller planks 242 may be configured absent spacers 243. In these exemplary embodiments, sling 262 may be disposed between platform 250 and roller planks 242, and platform 250 and roller planks 242 may be thereafter coupled together to retain sling 262 in a desired position. For example, platform 250 and roller planks 242 may be coupled together via fasteners 259. It will be appreciated that use of spacers 243 can facilitate equalization of tension among slings 262; however, in various exemplary embodiments this consideration may be of reduced importance, for example due to the limited weight of a particular payload, the crush resistance of a particular end plank 246, and/or the like. In these exemplary embodiments, spacers 243 may be eliminated, for example in order to reduce expense and/or reduce assembly requirements of expendable aerial delivery system 200.

In certain exemplary embodiments, and with reference now to FIG. 3C, expendable aerial delivery system 200 may be configured with slings 262 (for example, slings 362) having a desired length. In an exemplary embodiment, "outer" sling 362-O is configured to have a length greater than that of "inner" sling 362-I. By configuring outer slings 362-O with a length greater than inner slings 362-I forces arising from the operation of an extraction parachute may be more evenly distributed across structural component 240.

In certain exemplary embodiments and with reference to FIG. 3D, expendable aerial delivery system 200 is configured with at least one "double" or "combined" sling 363. For example, combined sling 363 may be configured to serve as both an "inner" sling and an "outer" sling. In various exemplary embodiments, combined sling 363 may be configured with a length approximately equal to the sum of the lengths of a corresponding inner sling and outer sling.

Combined sling 363 may be linked to an extraction parachute via any suitable mechanism. For example, combined sling 363 may be linked to an extraction parachute by passing a suspension line of the extraction parachute line through a loop formed by combined sling 363 (for example, as illustrated in FIG. 3D). Moreover, combined sling 363 may be linked to an extraction parachute via by passing combined sling 363 through a coupling ring 364 (for example, as illustrated in FIG. 3E). It will be appreciated that coupling ring 364 may comprise metal, fabric, or other suitable linkage or mechanism; moreover, coupling ring 364 may be configured to allow combined sling 363 to slide therethrough within a limited range of movement and/or otherwise be repositioned, for example responsive to forces arising from operation of an extraction parachute.

By utilizing a combined sling 363, forces arising from operation of an extraction parachute are more evenly distributed across structural component 240, as the force is distributed approximately equally along the "inner" and "outer" portions of combined sling 363.

Figure 4A:
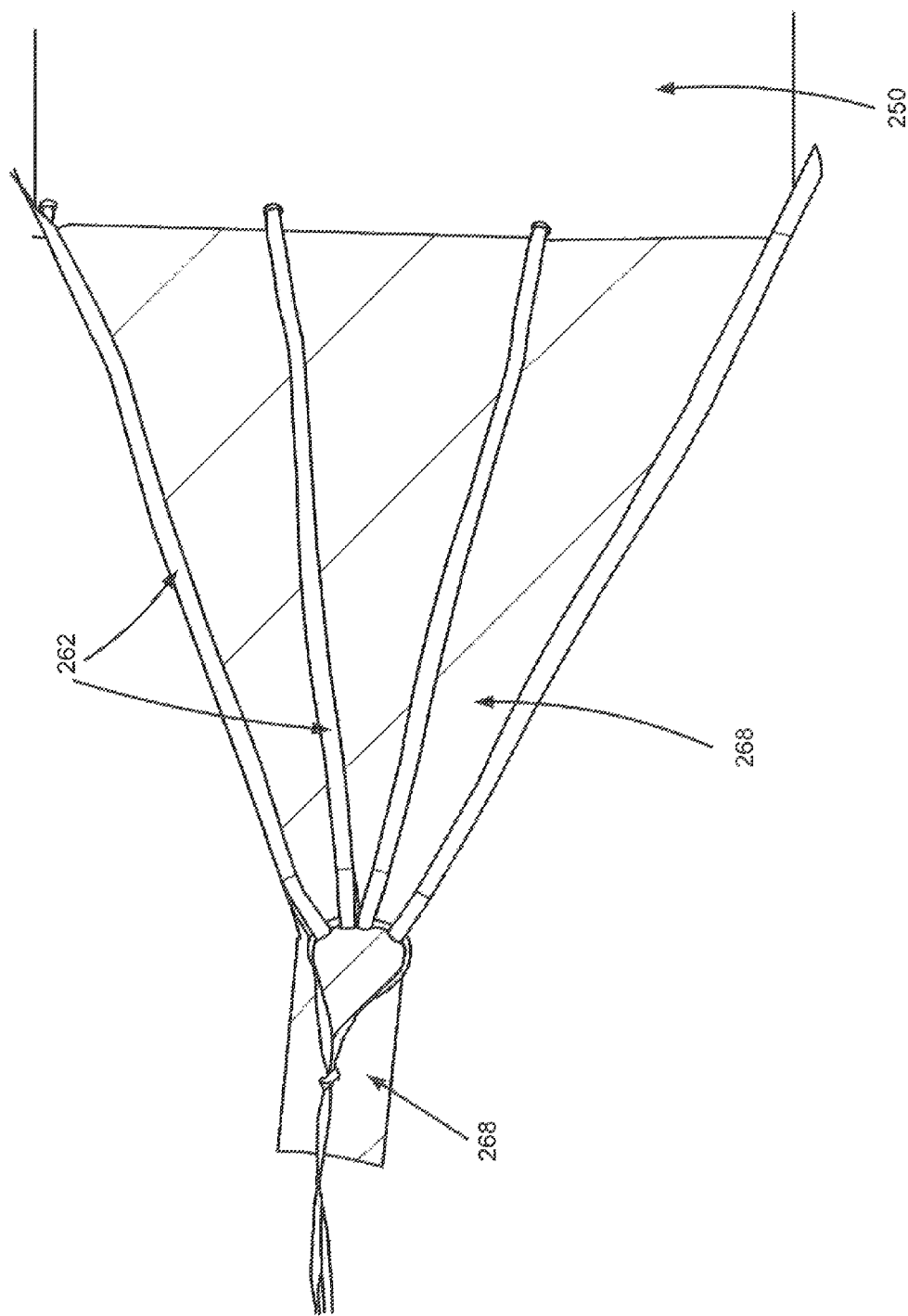
FIG. 4A illustrates a skid pad for use in an expendable aerial delivery system in accordance with an exemplary embodiment.

Turning now to FIG. 4A, in various exemplary embodiments one or more slings 262 may be utilized in connection with, and/or coupled to, a skid pad. In an exemplary embodiment, a skid pad 268 comprises a component or components configured to reduce and/or eliminate snagging, abrading, and/or otherwise damaging other portions of expendable aerial delivery system 200. For example, skid pad 268 can reduce or eliminate instances of slings 262 and/or parachute release devices from being damaged via contact with some portion of an aircraft during deployment of expendable aerial delivery system 200.

In various exemplary embodiments, skid pad 268 comprises a rigid, semi-rigid, and/or flexible material. In an exemplary embodiment, skid pad 268 comprises nylon fabric, in another exemplary embodiment, skid pad 268 comprises multiple layers of fabric, for example nylon, with a stiffening layer, for example felt, disposed therebetween. In various exemplary embodiments, skid pad 268 comprises expendable materials.

Skid pad 268 may be sized and/or shaped to generally align with the dimensions of various slings 262 and/or parachute release devices, in an exemplary embodiment, skid pad 268 is configured with a generally triangular shape configured to align with various slings 262, and with a generally rectangular extension configured to align with a parachute release device (for example, as illustrated in FIG. 4A). Skid pad 268 may be coupled to slings 262 in any suitable manner, for example via stapling, stitching, and/or the like.

Figure 4B:
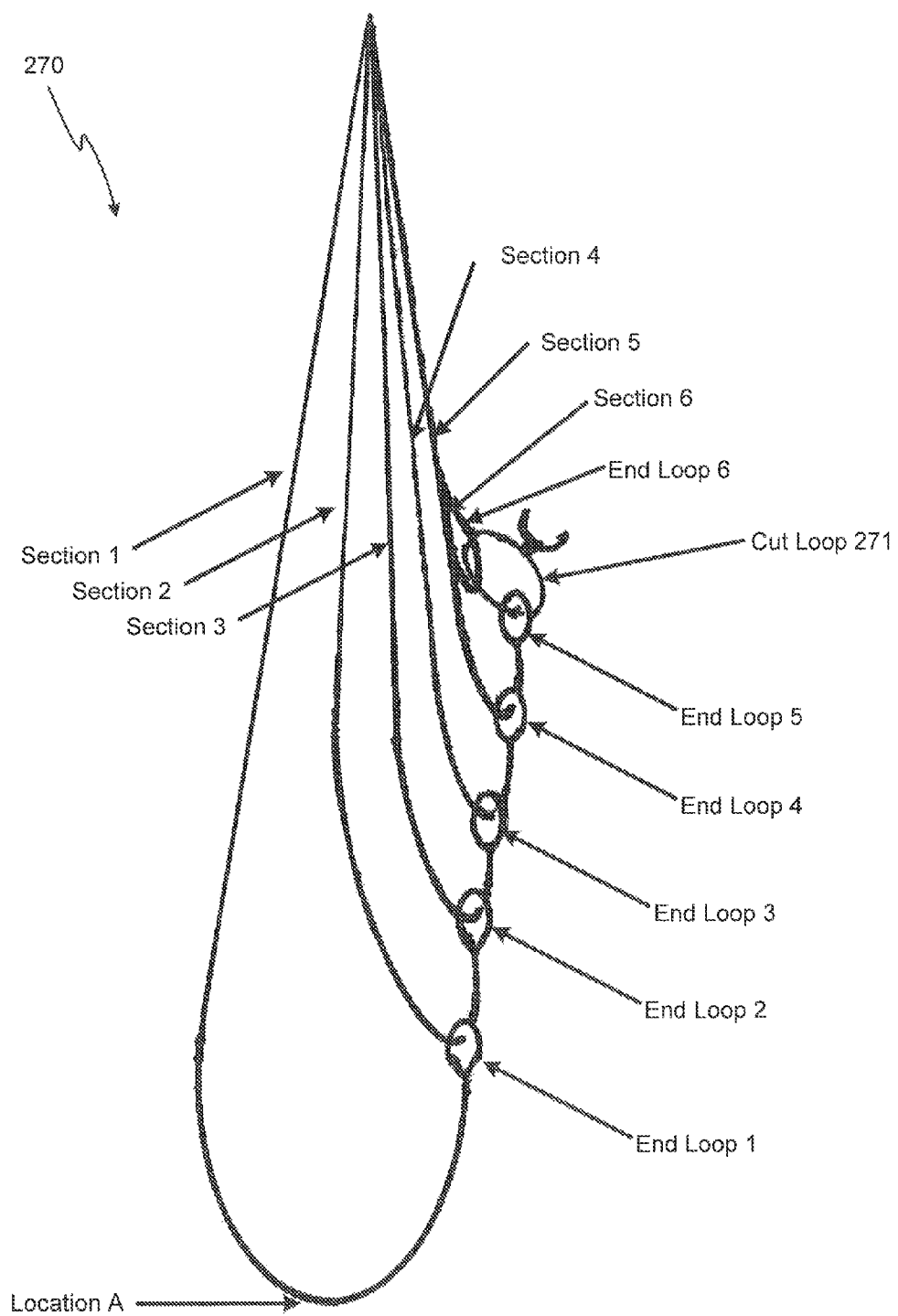
FIG. 4B illustrates an expendable sling release component for use with an expendable aerial delivery system in accordance with an exemplary embodiment.

Turning now to FIG. 4B, in various exemplary embodiments expendable aerial delivery system 200 may incorporate and/or be used in connection with a parachute release component or components comprised of expendable materials. In certain exemplary embodiments, aerial delivery system 200 may be utilized in connection with cascading loop release component 270.

In an exemplary embodiment, cascading loop release component 270 comprises a series of slings, cordage, webbing, and/or the like. Each length of cordage is configured with an end loop, and the lengths of cordage are successively shorter. The end loop of the longest section of cordage passed around the second longest length of cordage, the end loop of the second longest length of cordage passes around the third longest length of cordage, and so on (for example, as illustrated in FIG. 4B). It will be appreciated that when a mass is suspended by a cord fixed at two ends of the cord, the load X is shared equally between the two sections of the cord. Thus, when a load is affixed to Location "A" as illustrated in FIG. 4B, End Loop 1 is subjected to a load of $\frac{1}{2}$ X. Applying the same principle, End Loop 2 is subjected to a load of $\frac{1}{4}$ X, End Loop 3 is subjected to a load of $\frac{1}{8}$ X, and end loop 4 is subjected to a load of $\frac{1}{16}$ X, End Loop 5, End Loop 6, and the cut loop 271 are subjected to a load of $\frac{1}{32}$ X. Because cut loop 271 is subjected to a load much smaller than X, cut loop 271 can be configured to be more easily severable than other portions of cascading loop release component 270. For example, in various exemplary embodiments, a small force suitable for pulling a pin (and/or cutting and/or breaking a small cord) may be applied to release the extraction line of an extraction parachute from one or more slings (for example, slings 262 and/or combined slings 263). In various exemplary embodiments, a reefing cutter or, similar apparatus may be used to sever cut loop 271.

In various exemplary embodiments, cascading loop release component 270 is configured with a suitable number of sections to allow cut loop 271 to be sized as desired, in an exemplary embodiment, cascading loop release component 270 comprises six sections plus a cut loop (for example, as illustrated in FIG. 4B). In other exemplary embodiments, cascading loop release component 270 is configured with as few as 2 sections and/or as many as 12 sections, as desired. The number of sections may be based at least in part on the weight of a payload intended for delivery via expendable aerial delivery system 200, the size of an extraction parachute, the size of a main parachute, and/or the like.

It will be appreciated that in addition to the above-disclosed expendable parachute release components, expendable aerial delivery system 200 may suitably be utilized in connection with ring-and-webbing parachute release devices as are well known in the industry; moreover, expendable aerial delivery system 200 may be utilized in connection with mid-air release mechanisms such as quick release mechanisms often employed by helicopter operators when suspending loads beneath a helicopter, as is known in the industry. Yet further, expendable aerial release system 200 may be utilized in connection with a mid-air release mechanism such as those by Fox, for example as disclosed in U.S. Pat. No. 8,033,507 the contents of which are hereby incorporated by reference in their entirety.

Turning now to FIGS. 2F through 2I, in various exemplary embodiments expendable aerial delivery system 200 is configured with one or more payload coupling components 280. Payload coupling components 280 are configured to secure (and/or facilitate securing) payload 290 to expendable aerial delivery system 200. Payload coupling components 280 may comprise one or more of slings, straps, loops, webbing, cordage, and/or the like. In various exemplary embodiments, payload coupling components 280 comprise loops 284 and straps 288.

Figure 2G:
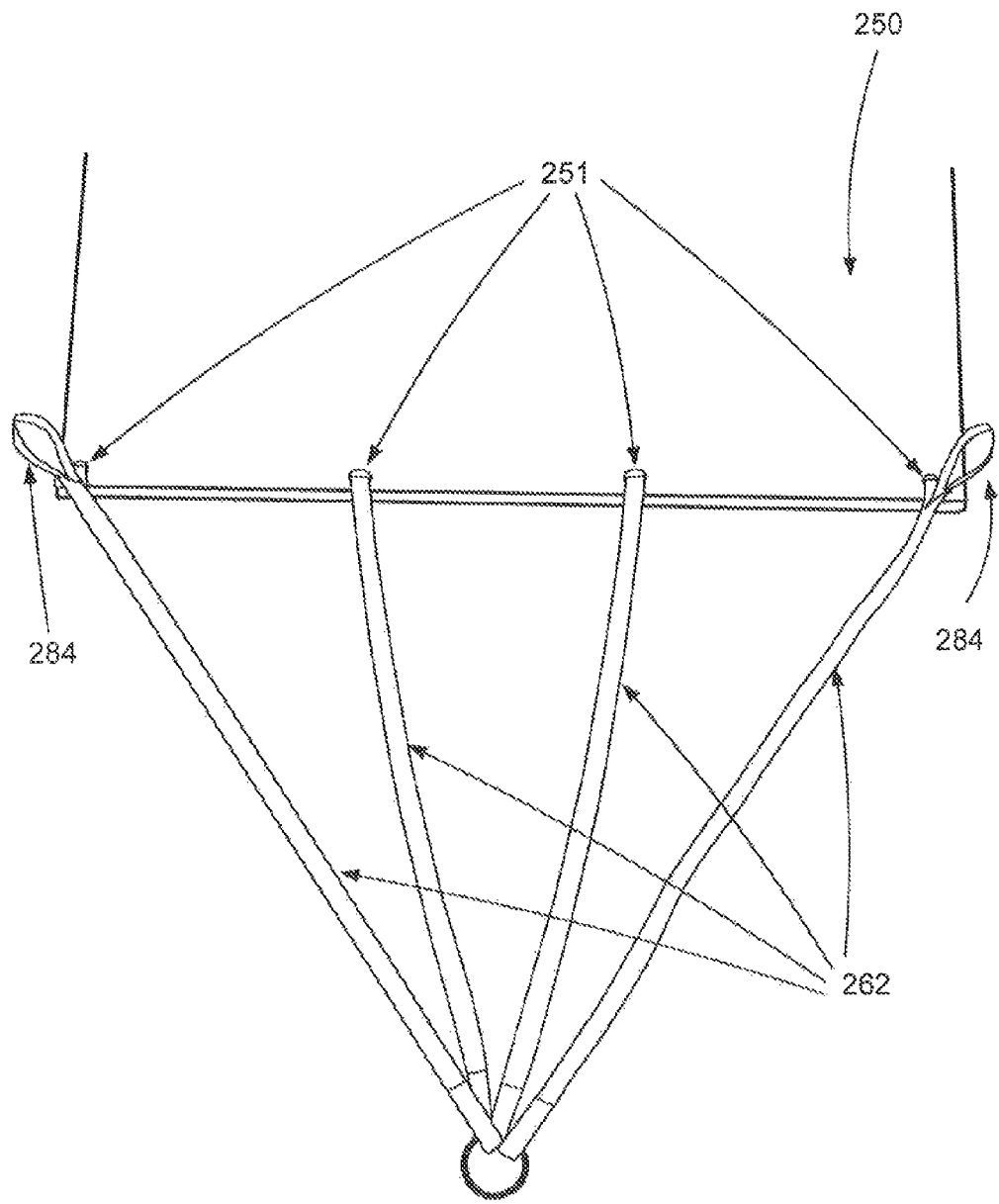
FIG. 2G illustrates an expendable aerial delivery system configured with a payload coupling loop in accordance with an exemplary embodiment.

In various exemplary embodiments, expendable aerial delivery system 200 is configured with a loop 284 on the rear corners of structural component 240, for example as illustrated in FIG. 2G. Loops 284 may be integral with slings 262; moreover, loops 284 may be fastened to and/or disposed around slings 262. In an exemplary embodiment, loops 284 are attached to slings 262 on the right and left side of fourth platform 250, respectively. Loops 284 extend at least partially along expendable aerial delivery system 200 in a direction towards the front.

Figure 2H:
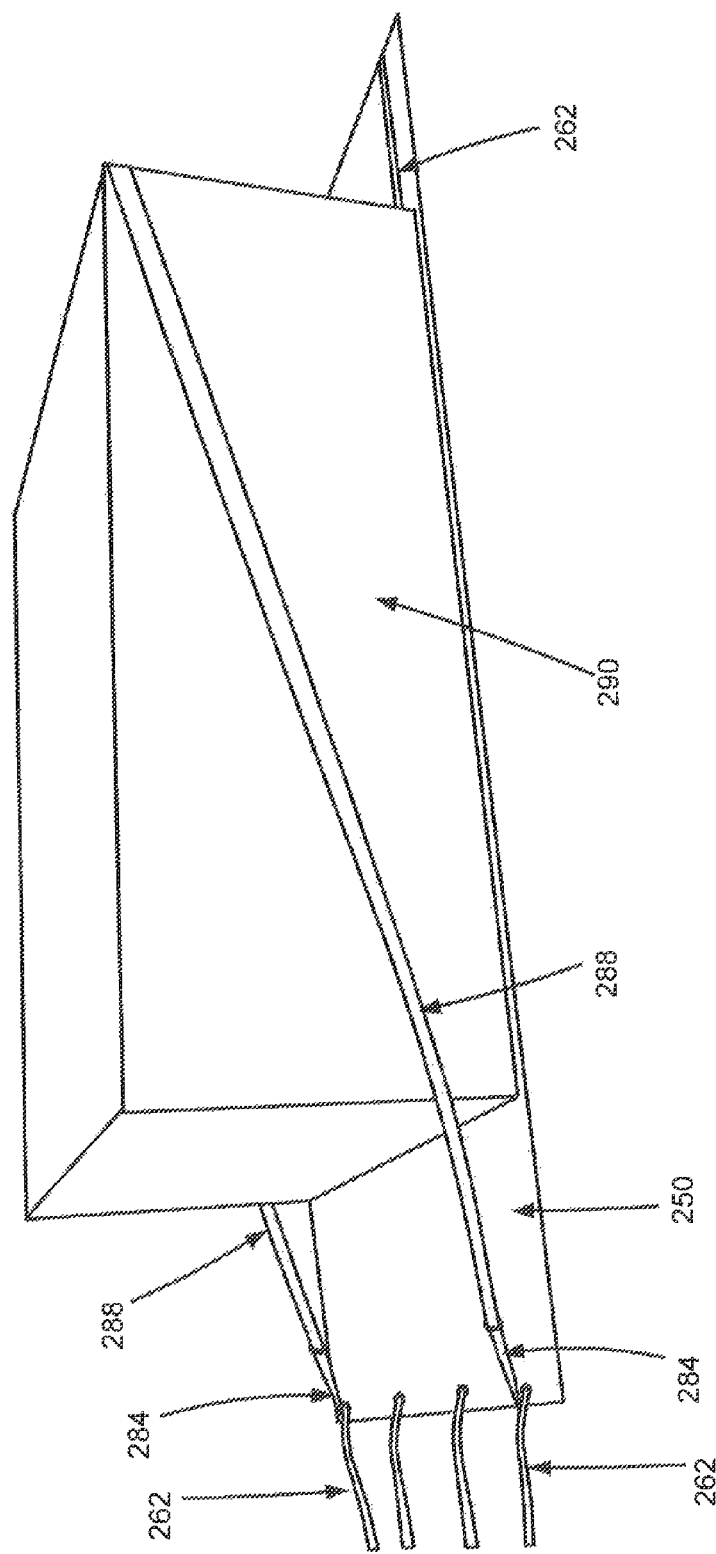
FIG. 2H illustrates a payload coupled to an expendable aerial delivery system in accordance with an exemplary embodiment.
Figure 21:
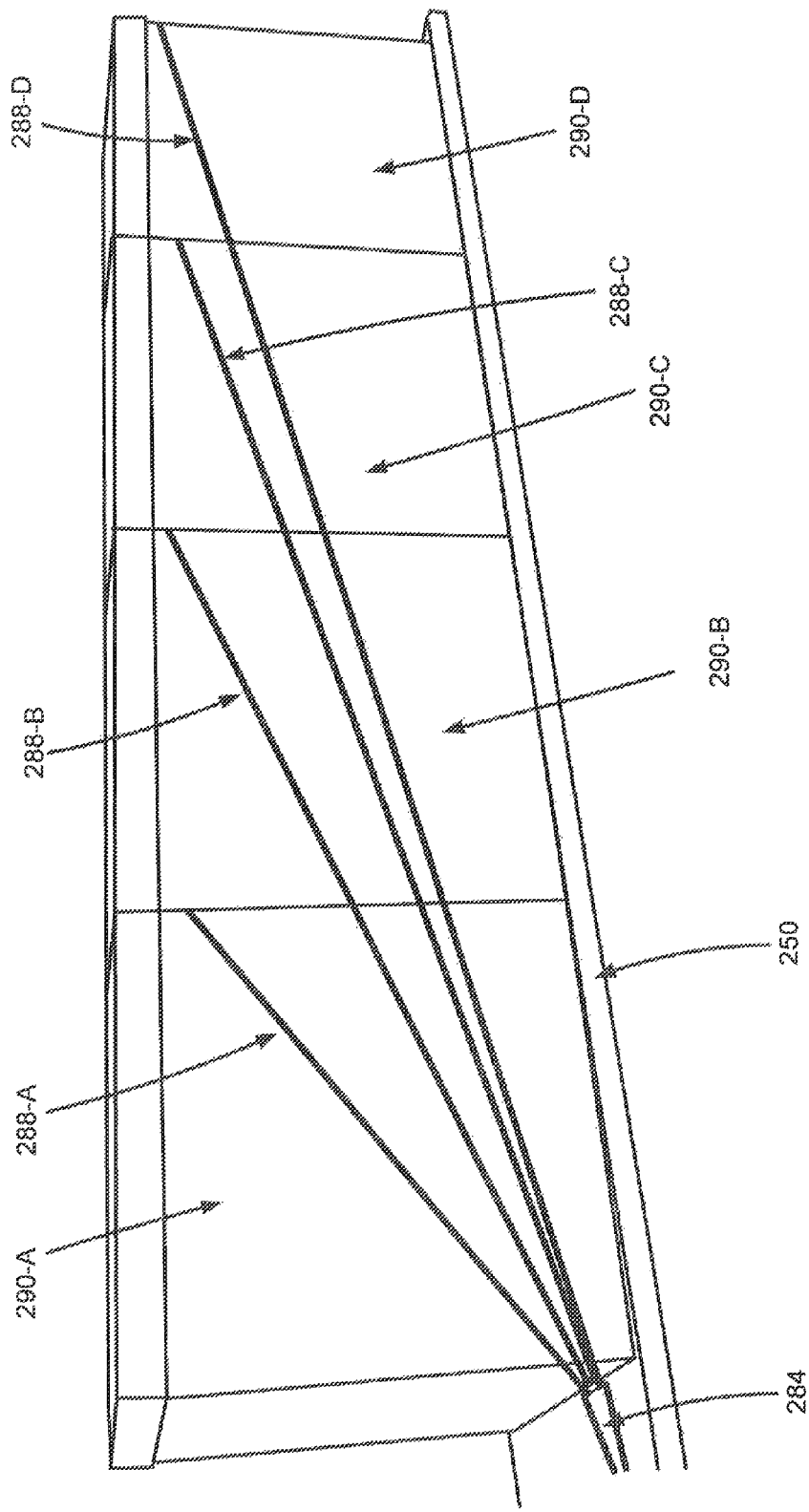

With reference now to FIG. 2H, in various exemplary embodiments a payload 290 may be secured to a platform 250 via one or more straps 288 coupled to loops 284. In an exemplary embodiment, a strap 288 is coupled to a first loop 284, extends along one side of payload 290, extends in "front" of payload 290 (i.e., extends along the side of payload 290 furthest from the extraction parachute), and extends along the other side of payload 290 and is coupled to a second loop 284. It will be appreciated that instead of (and/or in addition to) a strap or straps, a payload 290 may be secured to expendable aerial delivery system 200 via webbing or other retaining components, for example retaining components connected to loops 284.

In various exemplary embodiments, because a strap 288 passes to the "front" of payload 290, strap 288 at least partially supports payload 290 responsive to extraction parachute forces. When expendable aerial delivery system 200 is deployed from an aircraft via an extraction parachute, strap 288 acts somewhat like a "basket" to support payload 290. Stated another way, in various exemplary embodiments, in expendable aerial delivery system 200 extraction parachute forces are divided among structural component 240 and payload 290. Accordingly, structural component 240 can be made smaller, lighter, and/or with fewer materials than if structural component 240 were the recipient of all extraction parachute forces during deployment. Moreover, structural component 240 is less likely to be damaged during extraction.

In various exemplary embodiments, in addition to loops 284, it will be appreciated that similar loops may be placed at various locations along structural component 240. For example, in addition to loops 284 disposed generally at the rear corners of structural component 240, similar loops may be placed generally at the front corners of structural component 240, along the sides of structural component 240, and/or the like. Loops 284 and/or any additional loops may be used to secure a payload, to couple to a parachute (for example, a main parachute), and/or serve any other suitable function in connection with aerial delivery.

Turning to FIG. 2I, in various exemplary embodiments, multiple payloads 290 may be coupled to expendable aerial delivery system 200. In various exemplary embodiments, a series of payloads 290 may be stacked "in-line" and secured with respective straps 288. In an exemplary embodiment, payloads 290-A, 290-B, 290-C, and 290-D are secured on expendable aerial delivery system 200 via straps 288-A, 288-B, 288-C, and 288-D, respectively. Payloads 290A through 290-D may have similar weights and/or dimensions; alternatively, at least one payload 290 may differ in weight and/or dimension from another payload 290.

Figure 5:
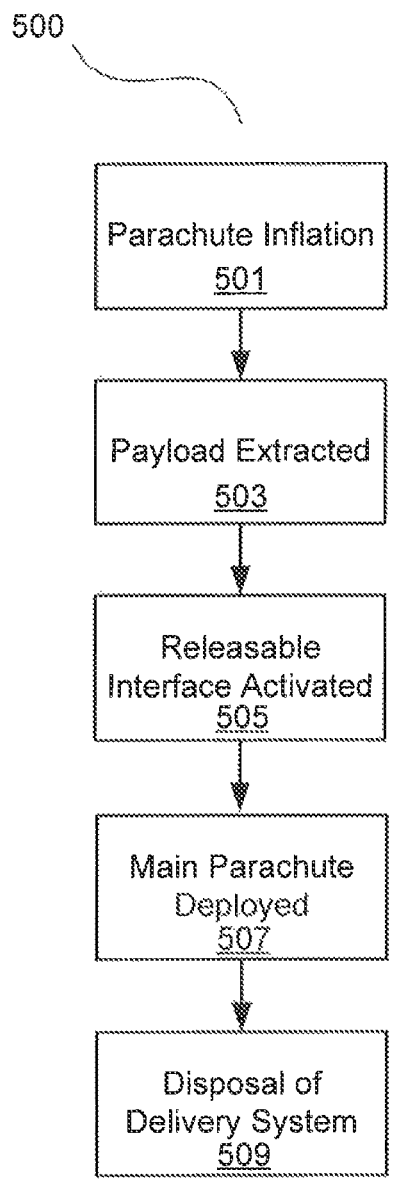
FIG. 5 illustrates a method for using an expendable aerial delivery system in accordance with an exemplary embodiment.

With reference now to FIG. 5, in various exemplary embodiments expendable aerial delivery system 200 may be utilized in a manner similar to a conventional Type V platform during an airdrop. For example, in a method 500 for aerial delivery, an aircraft crew launches an extraction parachute into the airstream behind the aircraft. Upon inflation of the parachute (step 501), a drag force is transferred through an extraction line to expendable aerial delivery system 200. Once a specific force is applied to expendable aerial delivery system 200 (the required force is dependent at least in part on payload weight), the means of securing expendable aerial delivery system 200 to the aircraft is overcome and the payload is pulled from the opening in the rear of the aircraft (step 503). Typically, the floor of the aircraft is equipped with rollers to facilitate the extraction process.

If it is desired to transition from the extraction parachute to another parachute system, such as a main parachute suitable to provide a desired low rate of descent, a releasable interface is provided between the extraction line and expendable aerial delivery system 200. In various exemplary embodiments, the releasable interface comprises cascading loop release component 270, and is disposed at the apex of slings 262 and/or combined slings 263. The releaseable interface may be activated shortly after expendable aerial delivery system 200 is extracted from the aircraft (for example, in the case of low altitude airdrops); moreover, the releasable interface may be activated after a delay (for example, in the case of higher altitude airdrops). When the releasable interface is released (step 505), the extraction parachute is freed from expendable aerial delivery system 200 and falls further behind expendable aerial delivery system 200 in the airstream. In this process, the drag force from the extraction parachute is transferred into a deployment line for a main parachute (step 507). After expendable aerial delivery system 200 has reached the ground, it may be destroyed and/or otherwise disposed of (step 509), for example by burning.

Figure 7A:
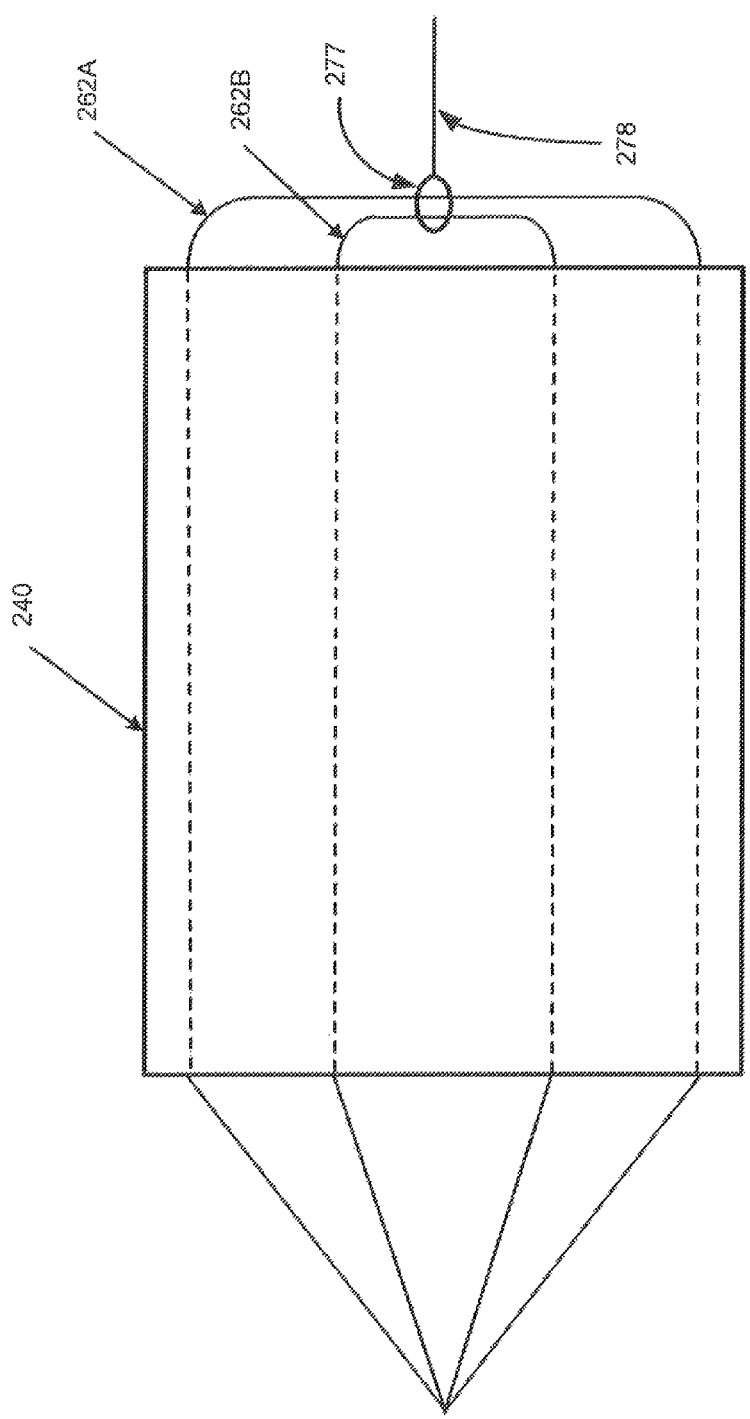
FIG. 7A illustrates a configuration for sling release at the "front" of an expendable aerial delivery system in accordance with an exemplary embodiment.

Turning now to FIG. 7A, in various exemplary embodiments expendable aerial delivery system 200 is configured with one or more slings 262 configured as a complete loop. In these exemplary embodiments, slings 262 may be released in alternative ways as compared to other exemplary embodiments disclosed herein, for example via separation occurring at the "front" of expendable aerial delivery system 200. For example, in an exemplary embodiment expendable aerial delivery system 200 is configured with a first sling 262A disposed as an "outer" sling on both sides of platform 250, and a second sling 262B disposed as an "inner" sling. It will be appreciated that any suitable number of slings 262 configured as complete loops may be used.

Slings 262A and 262B may pass through and/or be surrounded by a knife 277 coupled to a lanyard 278. Knife 277 is configured to sever slings 262A and 262B responsive to a force transferred through lanyard 278, thus decoupling slings 262A and 262B from expendable aerial delivery system 200.

In various exemplary embodiments, knife 277 and lanyard 278 are anchored to the structure of an aircraft, for example to an anchor ring in the aircraft floor, a cable extending along the cargo area of the aircraft, and/or the like. The length of lanyard 278 may be selected to initiate the release of slings 262 at a desired location relative to the aircraft after expendable aerial delivery system 200 has exited the aircraft. In certain exemplary embodiments, lanyard 278 has a length configured to result in release of slings 262 at approximately the same time as the front of expendable aerial delivery system 200 leaves contact with the aircraft ramp. In various exemplary embodiments, lanyard 278 is configured with a length of between about 12 feet and about 25 feet.

Figure 7B:
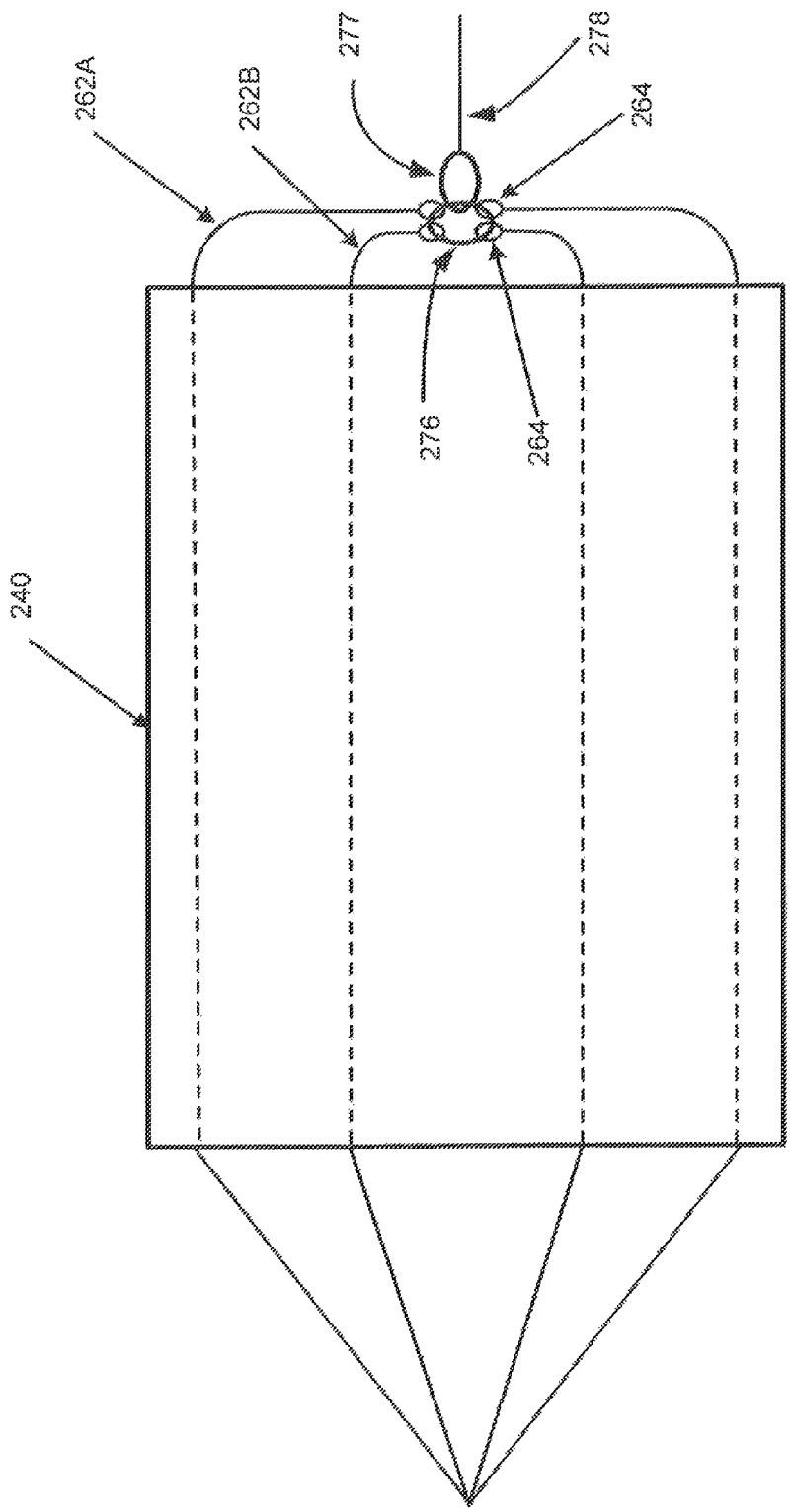
FIG. 7B illustrates another configuration for sling release at the "front" of an expendable aerial delivery system in accordance with an exemplary embodiment.

In other exemplary embodiments, with reference now to FIG. 7B, expendable aerial delivery system 200 is configured with one or more slings 262 configured with end loops 264. In these exemplary embodiments, end loops 264 may be disposed at the "front" of expendable aerial delivery system 200. A shared cut loop 276 passes through end loops 264, and cut loop 276 passes through and/or is surrounded by knife 277 coupled to lanyard 278 as discussed above. Responsive to a force transferred through lanyard 278, knife 277 severs cut loop 276 and slings 262 are decoupled from expendable aerial delivery system 200. It will be appreciated that cut loop 276 as illustrated in FIG. 7B serves a similar functional purpose as does cut loop 271 as illustrated in FIG. 4B.

With reference now to FIG. 7C, in various exemplary embodiments, when expendable aerial delivery system 200 is configured with one or more slings 262 configured with end loops 264, a pull pin 279 may be utilized instead of knife 277. End loops 264 may be coupled to pull pin 279 as is known in the art, and pull pin 279 may be coupled to lanyard 278. Responsive to a force transferred through lanyard 278, pull pin 279 separates from end loops 264 and slings 262 are decoupled from expendable aerial delivery system 200. In an exemplary embodiment, pull pin 279 is a straight pin. In other exemplary embodiments, with momentary reference to FIG. 7D, pull pin 279 is a curved pin, which may require a smaller force (as compared to a straight pin) to separate from end loops 264 when an off angle pull is encountered.

In various other exemplary embodiments, in order to implement the release of slings 262 at a time when expendable aerial delivery system 200 is well outside the aircraft, the combination of knife 277 or pull pin 279 with lanyard 278 may be replaced with a stored energy cutting device and/or a stored energy pin pulling device as is known in the aerial delivery industry.

Moreover, it will be appreciated that in these exemplary embodiments wherein sling separation occurs at the "front" of expendable aerial delivery system 200, increased lateral compression forces may be exerted on the front side of expendable aerial delivery system 200, and thus one or more end planks 246 and/or other components configured to resist lateral compression may be provided and sized appropriately.

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure and may be expressed in the following claims.

In the foregoing specification, principles of the present disclosure have been described with reference to various embodiments. However, one of ordinary skill in the art appreciates that various modifications and changes can be made without departing from the scope of the claims below. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof, are intended to cover a physical connection, a communicative connection, a functional connection, and/or any other connection.

What is claimed is:

1. An expendable aerial delivery system, comprising:
a platform comprising an expendable material;
a roller plank coupled to the platform, the roller plank comprising an expendable material;
a sling configured to couple the platform to a parachute;
a strap configured to retain a payload to the platform; and
a stop block coupled to the sling, wherein the stop block simultaneously transfers forces arising from an extraction parachute to the platform and the roller plank.

2. An expendable aerial delivery system, comprising:
a platform comprising an expendable material;
a roller plank coupled to the platform, the roller plank comprising an expendable material;
a sling configured to couple the platform to a parachute;
a strap configured to retain a payload to the platform; and
a stop block coupled to the sling, wherein the stop block reduces shear forces between the platform and the roller plank responsive to operation of an extraction parachute.

3. An expendable aerial delivery system, comprising:
a platform comprising an expendable material;
a roller plank coupled to the platform, the roller plank comprising an expendable material;
a sling configured to couple the platform to a parachute; and
a strap configured to retain a payload to the platform;
wherein the roller plank is configured with a trench formed by at least one spacer, wherein the sling is disposed between the roller plank and the platform in the trench, and wherein the sling encircles at least a portion of the platform.

4. An expendable aerial delivery system, comprising:
a platform comprising an expendable material;
a roller plank coupled to the platform, the roller plank comprising an expendable material;
a sling configured to couple the platform to a parachute; and
a strap configured to retain a payload to the platform;
wherein the sling is configured as a combined sling disposed between the platform and multiple roller planks.

5. The system of claim 1, wherein the roller plank aligns with a roller assembly in a cargo plane when the expendable aerial delivery system is placed in the cargo plane.

6. The system of claim 1, further comprising a notched siderail configured to interface with the locks in a cargo plane.

7. The system of claim 1, wherein the expendable aerial delivery system is configured to deliver a payload exceeding 500 pounds.

8. The system of claim 1, further comprising a plurality of roller pads.

9. The system of claim 1, further comprising an end plank disposed at the rear of the platform, wherein the end plank resists crushing of the platform toward the centerline responsive to forces arising from operation of an extraction parachute.

10. An expendable aerial delivery system, comprising:
a platform comprising an expendable material;
a roller plank coupled to the platform, the roller plank comprising an expendable material;
a sling configured to couple the platform to a parachute;
a strap configured to retain a payload to the platform; and
a cascading loop release component coupled to the sling.

11. The system of claim 1, wherein the strap passes along the front side of the payload to reduce shear forces between the payload and the platform.

12. The system of claim 1, wherein the sling is severable at the front side of the platform to separate the parachute from the platform.

* * * * *